US012448633B2

(12) United States Patent
Summers et al.

(10) Patent No.: US 12,448,633 B2
(45) Date of Patent: Oct. 21, 2025

(54) BACTERIAL N-DEMTHYLASES AS BIOCATALYSTS FOR THE PRODUCTION OF METHYLXANTHINES

(71) Applicant: The Board of Trustees of The University of Alabama, Tuscaloosa, AL (US)

(72) Inventors: Ryan M. Summers, Northport, AL (US); Shelby Mills, Tuscaloosa, AL (US); Meredith Mock, Tuscaloosa, AL (US)

(73) Assignee: The Board of Trustees of The University of Alabama, Tuscaloosa, AL (US)

( * ) Notice: Subject to any disclaimer, the term of this patent is extended or adjusted under 35 U.S.C. 154(b) by 0 days.

(21) Appl. No.: 17/883,115

(22) Filed: Aug. 8, 2022

(65) Prior Publication Data

US 2023/0193332 A1 Jun. 22, 2023

Related U.S. Application Data

(60) Provisional application No. 63/230,466, filed on Aug. 6, 2021.

(51) Int. Cl.
*C12P 17/14* (2006.01)
*C12N 1/21* (2006.01)
*C12N 9/02* (2006.01)

(52) U.S. Cl.
CPC ............ *C12P 17/14* (2013.01); *C12N 9/0071* (2013.01); *C12Y 114/00* (2013.01)

(58) Field of Classification Search
None
See application file for complete search history.

(56) References Cited

FOREIGN PATENT DOCUMENTS

EP          0036776 A2   9/1981
WO   WO-2013059507 A1 * 4/2013  ........... C12N 9/0071

OTHER PUBLICATIONS

Kim et al., Structural and Mechanistic Insights into Caffeine Degradation by the Bacterial N-Demethylase Complex, J. Mol. Biol. 431, 2019, 3647-61. (Year: 2019).*
Summers et al., Genetic characterization of caffeine degradation by bacteria and its potential applications, Microbial Biotechnol., 8, 2015, 369-78 (Year: 2015).*
Gonzalez et al., Molecular Basis of Formaldehyde Detoxification, J. Biol. Chem. 281, 2006, 14514-22. (Year: 2006).*
Berrios-Rivera, Metabolic Engineering of *Escherichia coli* : Increase of NADH Availability by Overexpressing an NAD+-Dependent Formate Dehydrogenase, Metabolic Eng. 4, 2002, 217-229. (Year: 2002).*
Mock et al., Biocatalytic Production and Purification of the High-value Biochemical Paraxanthine, Biotechnol. Bioprocess Eng. 27, 2022, 640-51. (Year: 2022).*
Ling et al., Approaches to DNA Mutagenesis, Analytical Biochem. 254, 1997, 157-78. (Year: 1997).*
Held et al., "New coexpression vectors for expanded compatibilities in *E. coli*." InNovations, 18(4), 6, 1-32.
Hergueta et al., "Synthesis of series of 1-and 3-differently substituted xanthines from imidazoles." Chemical and pharmaceutical bulletin 50.10 (2002): 1379-1382.
Herring et al., "Global transcriptional effects of a suppressor tRNA and the inactivation of the regulator frmR." Journal of bacteriology 186.20 (2004): 6714-6720.
Hollingsworth et al., "Caffeine as a repellent for slugs and snails." nature 417.6892 (2002): 914-916.
Hung et al., "The adenosine receptor antagonist, 7-methylxanthine, alters emmetropizing responses in infant macaques." Investigative ophthalmology & visual science 59.1 (2018): 472-486.
Janitschke et al., "Methylxanthines and neurodegenerative diseases: An update." Nutrients 13.3 (2021): 803, 1-18.
Klemmer et al., "Oral application of 1, 7-dimethylxanthine (paraxanthine) attenuates the formation of experimental cholestatic liver fibrosis." Hepatology Research 41.11 (2011): 1094-1109.
Koh, "Engineering selectivity and discrimination into ligand-receptor interfaces." Chemistry & biology 9.1 (2002): 17-23.
Larsson, "Coffee, tea, and cocoa and risk of stroke." Stroke 45.1 (2014): 309-314.
Lee et al., "Novel methylxanthine derivative-mediated anti-inflammatory effects in inflammatory bowel disease." World Journal of Gastroenterology: WJG 20.5 (2014): 1127-1139.
Liebeskind et al., "The coffee paradox in stroke: Increased consumption linked with fewer strokes." Nutritional neuroscience 19.9 (2016): 406-413.
Lindsay et al., "More than the epidemiology of Alzheimer's disease: contributions of the Canadian Study of Health and Aging." The Canadian Journal of Psychiatry 49.2 (2004): 83-91.
Lutz et al., "Independent and tight regulation of transcriptional units in *Escherichia coli* via the LacR/O, the TetR/O and AraC/I1-I2 regulatory elements." Nucleic acids research 25.6 (1997): 1203-1210.
Macwilliams et al., "Luria broth (LB) and Luria agar (LA) media and their uses protocol." ASM MicrobeLibrary. American Society for Microbiology 2006 (2006): 1-4.
Maia et al., "Does caffeine intake protect from Alzheimer's disease?. " European journal of neurology 9.4 (2002): 377-382.
Maxam et al., "[57] Sequencing end-labeled DNA with base-specific chemical cleavages." Methods in enzymology. vol. 65. Academic Press (1980): 499-560.
Mazzafera, "Degradation of caffeine by microorganisms and potential use of decaffeinated coffee husk and pulp in animal feeding." Scientia Agricola 59 (2002): 815-821.
Messing et al., "A system for shotgun DNA sequencing." Nucleic acids research 9.2 (1981): 309-321.

(Continued)

*Primary Examiner* — Todd M Epstein
(74) *Attorney, Agent, or Firm* — Meunier Carlin & Curfman LLC

(57) ABSTRACT

The present disclosure relates to mutant enzymes and bacterial strains constructed to produce paraxanthine and 7-methylxanthine from caffeine and methods for the manufacture and use thereof.

5 Claims, 19 Drawing Sheets

Specification includes a Sequence Listing.

(56) References Cited

OTHER PUBLICATIONS

Mock et al., "Substrate promiscuity of the NdmCDE N7-demethylase enzyme complex." Biotechnology Notes 2 (2021): 18-25.
Mohamed et al., "Synthesis and anticancer activity of silver (I)-N-heterocyclic carbene complexes derived from the natural xanthine products caffeine, theophylline and theobromine." Dalton Transactions 44.16 (2015): 7563-7569.
Mohanpuria et al., "Tea caffeine: metabolism, functions, and reduction strategies." Food Science and Biotechnology 19 (2010): 275-287.
Monteiro et al., "Pharmacological potential of methylxanthines: Retrospective analysis and future expectations." Critical reviews in food science and nutrition 59.16 (2018): 2596-2625.
Morley et al., "Improving enzyme properties: when are closer mutations better?." Trends in biotechnology 23.5 (2005): 231-237.
Müller et al., "A new versatile synthesis of xanthines with variable substituents in the 1-, 3-, 7-and 8-positions." Synthesis Oct. 1995 (1995): 1295-1299.
Nafisi et al., "Structural features of DNA interaction with caffeine and theophylline." Journal of Molecular Structure 875.1-3 (2008): 391-399.
Nathanson, "Caffeine and related methylxanthines: possible naturally occurring pesticides." Science 226.4671 (1984): 183-187.
Negida et al., "Caffeine; the forgotten potential for Parkinson's disease." CNS & Neurological Disorders—Drug Targets (Formerly Current Drug Targets—CNS & Neurological Disorders) 16.6 (2017): 1-6.
Negus et al., "Intracranial self-stimulation to evaluate abuse potential of drugs." Pharmacological reviews 66.3 (2014): 869-917.
Nunnari et al., "Inhibition of HIV-1 replication by caffeine and caffeine-related methylxanthines." Virology 335.2 (2005): 177-184.
Okuro et al., "Effects of paraxanthine and caffeine on sleep, locomotor activity, and body temperature in orexin/ataxin-3 transgenic narcoleptic mice." Sleep 33.7 (2010): 930-942.
Oñatibia-Astibia et al., "Health benefits of methylxanthines in neurodegenerative diseases." Molecular nutrition & food research 61.6 (2017): 1600670.
Orrú et al., "Psychostimulant pharmacological profile of paraxanthine, the main metabolite of caffeine in humans." Neuropharmacology 67 (2013): 1-22.
Park et al., "Focusing mutations into the P. fluorescens esterase binding site increases enantioselectivity more effectively than distant mutations." Chemistry & biology 12.1 (2005): 45-54.
Ponte et al., "Associations of urinary caffeine and caffeine metabolites with arterial stiffness in a large population-based study." Mayo Clinic Proceedings. vol. 93. No. 5. Elsevier (2018): 1-11.
Quadra et al., "A global trend of caffeine consumption over time and related-environmental impacts." Environmental Pollution 256 (2020): 113343.
Quandt et al., "Decaffeination and measurement of caffeine content by addicted *Escherichia coli* with a refactored N-demethylation operon from Pseudomonas putida CBB5." ACS synthetic biology 2.6 (2013): 301-307.
Quandt et al., "Draft genome sequence of the bacterium Pseudomonas putida CBB5, which can utilize caffeine as a sole carbon and nitrogen source." Genome Announcements 3.3 (2015): 1-2.
Rajagopalan et al., "Coupling interactions of distal residues enhance dihydrofolate reductase catalysis: mutational effects on hydride transfer rates." Biochemistry 41.42 (2002): 12618-12628.
Retnadhas et al., "Identification and characterization of oxidoreductase component (NdmD) of methylxanthine oxygenase system in *Pseudomonas* sp. NCIM 5235." Applied microbiology and biotechnology 102 (2018): 7913-7926.
Ross et al., "Association of coffee and caffeine intake with the risk of Parkinson disease." Jama 283.20 (2000): 2674-2679.
Runquist et al., "Increased ethanol productivity in xylose-utilizing *Saccharomyces cerevisiae* via a randomly mutagenized xylose reductase." Applied and environmental microbiology 76.23 (2010): 7796-7802.
Salis, "The ribosome binding site calculator." Methods in enzymology. vol. 498. Academic Press (2011): 18-42.
Sanger et al., "DNA sequencing with chain-terminating inhibitors." Proceedings of the national academy of sciences 74.12 (1977): 5463-5467.
Schneider, "Mechanisms of molecular recognition: investigations of organic host-guest complexes." Angewandte Chemie International Edition in English 30.11 (1991): 1417-1436.
Scurachio et al., "Caffeine metabolites not caffeine protect against riboflavin photosensitized oxidative damage related to skin and eye health." Journal of Photochemistry and Photobiology B: Biology 163 (2016): 277-283.
Siebenlist et al., "*E. coli* RNA polymerase interacts homologously with two different promoters." Cell 20.2 (1980): 269-281.
Siegele et al., "Gene expression from plasmids containing the araBAD promoter at subsaturating inducer concentrations represents mixed populations." Proceedings of the National Academy of Sciences 94.15 (1997): 8168-8172.
Singh et al., "Pre-clinical and cellular toxicity evaluation of 7-methylxanthine: an investigational drug for the treatment of myopia." Drug and chemical toxicology (2019): 1-10.
Singh et al., "Xanthine scaffold: scope and potential in drug development." Heliyon 4.10 (2018): 1-38.
Smith, "Caffeine, cognitive failures and health in a non-working community sample." Human Psychopharmacology: Clinical and Experimental 24.1 (2009): 28-34.
Agilent, "QuikChange Lightning Multi Site-Directed Mutagenesis Kit Instruction Manual," Revision E.0. 2015.
Ahmad et al., "Bacterial Degradation of Caffeine: A Review." Asian Journal of Plant Biology e-ISSN 2289-5868 2.1 2014: 18-27.
Algharrawi et al., "Direct conversion of theophylline to 3-methylxanthine by metabolically engineered *E. coli*." Microbial cell factories 14 2015: 1-12.
Algharrawi et al., "Production of 7-methylxanthine from Theobromine by Metabolically Engineered *E. coli*." Iraqi Journal of Chemical and Petroleum Engineering 21.3 2020: 19-27.
Algharrawi et al., "Production of theobromine by N-demethylation of caffeine using metabolically engineered *E. coli*." Biocatalysis and Agricultural Biotechnology 11 2017: 153-160.
Andreeva et al., "Methylxanthines: Properties and determination in various objects." Russian Chemical Reviews 81.5 2012: 396-414.
Arnaud et al., "Pharmacokinetics and metabolism of natural methylxanthines in animal and man." Methylxanthines 2011: 33-91.
Ashengroph, "Salinivibrio costicola GL6, a novel isolated strain for biotransformation of caffeine to theobromine under hypersaline conditions." Current microbiology 74 2017: 34-41.
Ashihara et al., "Caffeine and related purine alkaloids: biosynthesis, catabolismfunction and genetic engineering." Phytochemistry 69.4 2008: 840-856.
Barnes, "Theophylline." American journal of respiratory and critical care medicine 188.8 2013: 901-906.
Berríos-Rivera et al., "The effect of increasing NADH availability on the redistribution of metabolic fluxes in *Escherichia coli* chemostat cultures." Metabolic Engineering 4.3 (2002): 230-237.
Bertrand et al., "Xanthine-based gold I N-heterocyclic carbene complexes: synthesis and anticancer evaluation." XVIth International Conference on Biological Inorganic Chemistry ICBIC16. vol. 19. No. S1. Springer, 2013: 1-3.
Boehr et al., "The role of dynamic conformational ensembles in biomolecular recognition." Nature chemical biology 5.11 2009: 1-18.
Bolivar et al., "Construction and characterization of new cloning vehicle. II. A multipurpose cloning system." Gene 2.2 1977: 95-113.
Bornscheuer et al., "Improved biocatalysts by directed evolution and rational protein design." Current opinion in chemical biology 5.2 2001: 137-143.
Camandola et al., "Impact of coffee and cacao purine metabolites on neuroplasticity and neurodegenerative disease." Neurochemical research 44 2019: 1-24.
Chang et al., "Phenotypic expression in *E. coli* of a DNA sequence coding for mouse dihydrofolate reductase." Nature 275.5681 1978: 617-624.

(56) References Cited

OTHER PUBLICATIONS

Chen et al., "Formaldehyde stress responses in bacterial pathogens." Frontiers in microbiology 7 2016: 1-17.
Chung et al., "A rapid and convenient method for the preparation and storage of competent bacterial cells." Nucleic acids research 16.8 1988: 3580.
Chung et al., "One-step preparation of competent *Escherichia coli*: transformation and storage of bacterial cells in the same solution." Proceedings of the National Academy of Sciences 86.7 1989: 2172-2175.
Costenla et al., "Adenosine modulates synaptic plasticity in hippocampal slices from aged rats." Brain research 851.1-2 1999: 228-234.
Costenla et al., "Caffeine, adenosine receptors, and synaptic plasticity." Journal of Alzheimer's Disease 20.s1 (2010): S25-S34.
Dalby, "Optimising enzyme function by directed evolution." Current opinion in structural biology 13.4 2003: 500-505.
Dash et al., "Catabolic pathways and biotechnological applications of microbial caffeine degradation." Biotechnology letters 28 2006: 1993-2002.
Dash, "Biodegradation of caffeine by *Pseudomonas* sp. NCIM 5235." Research journal of Microbiology, 12, 2006: 114-123.
De Boer et al., "The tac promoter: A functional hybrid derived from the trp and lac promoters," Proc. Natl. Acad. Sci. USA, 80 1983: 21-25.
Denby et al., "The mechanism of a formaldehyde-sensing transcriptional regulator." Scientific reports, 61, 2016: 1-15.
Dill, "Dominant forces in protein folding." Biochemistry 29.31 1990: 7133-7155.
El-Mched et al., "Optimization of the environmental and physiological factors affecting microbial caffeine degradation and its application in caffeinated products." Basic Res J Microbiol 1.2 2013: 17-27.
Ergin et al., "Coffee toxicology, processing of the coffee and liver diseases is it a miracle of nature?." Journal of Food Processing and Preservation 45.4 2021: e15243.
Eskelinen et al., "Midlife coffee and tea drinking and the risk of late-life dementia: a population-based CAIDE study." Journal of Alzheimer's disease 16.1 2009: 85-91.
Ferré et al., "Paraxanthine: Connecting caffeine to nitric oxide neurotransmission." Journal of Caffeine Research 3.2 2013: 72-78.
Fleishman et al., "Restricted sidechain plasticity in the structures of native proteins and complexes." Protein Science 20.4 (2011): 753-757.
Franco et al., "Health benefits of methylxanthines in cacao and chocolate." Nutrients 5.10 2013: 4159-4173.
Geraets et al., "Inhibition of acute pulmonary and systemic inflammation by 1, 7-dimethylxanthine." European journal of pharmacology 629.1-3 2010: 132-139.
Goeddel et al., "Direct expression in *Escherichia coli* of a DNA sequence coding for human growth hormone." Nature 281.5732 1979: 544-548.
Goeddel et al., "Synthesis of human fibroblast interferon by *E. coli*." Nucleic Acids Research 8.18 1980: 4057-4074.
Gopishetty et al., "Microbial degradation of caffeine, methylxanthines, and its biotechnological applications." Microbial biotechnology methods and applications. New Delhi: Narosa Publishing Houst Pvt, Ltd 2012: 44-67.
Gressner et al., "Identification of paraxanthine as the most potent caffeinederived inhibitor of connective tissue growth factor expression in liver parenchymal cells." Liver International 29.6 2009: 886-897.
Gressner, "About coffee, cappuccino and connective tissue growth factoroR How to Protect Your Liver!?." Environmental Toxicology and Pharmacology 28.1 2009: 1-10.
Grosso et al., "Coffee, tea, caffeine and risk of depression: A systematic review and doseresponse metaanalysis of observational studies." Molecular nutrition & food research 60.1 2016: 223-234.
Guerreiro et al., "Paraxanthine, the primary metabolite of caffeine, provides protection against dopaminergic cell death via stimulation of ryanodine receptor channels." Molecular pharmacology 74.4 2008: 980-989.
Gulevskaya et al., "Synthesis of N-substituted xanthines." Chemistry of Heterocyclic compounds 27 1991: 1-23.
Gutheil et al., "Induction of glutathione-dependent formaldehyde dehydrogenase activity in *Escherichia coli* and Hemophilus influenza." Biochemical and biophysical research communications 238.3 (1997): 693-696.
Guzman et al., "FtsL, an essential cytoplasmic membrane protein involved in cell division in *Escherichia coli*." Journal of bacteriology 174.23 1992: 7717-7728.
Guzman et al., "Tight regulation, modulation, and high-level expression by vectors containing the arabinose PBAD promoter." Journal of bacteriology 177.14 1995: 4121-4130.
Haldimann et al., "Use of new methods for construction of tightly regulated arabinose and rhamnose promoter fusions in studies of the *Escherichia coli* phosphate regulon." Journal of bacteriology 180.5 1998: 1277-1286.
Harris et al., "Engineering enzyme specificity." Current opinion in chemical biology 2.1 1998: 127-132.
Hawke et al., "Paraxanthine, a caffeine metabolite, dose dependently increases [Ca2+] i in skeletal muscle." Journal of Applied Physiology 89.6 (2000): 2312-2317.
He et al., "A highly efficient solid-phase synthesis of 1, 3-substituted xanthines." Journal of Combinatorial Chemistry 7.6 (2005): 916-920.
Sektas et al., "Novel single-copy pETcoco™ vector with dual controls for amplification and expression." InNovations, Jul. 2002, vol. 14, pp. 10-12.
Stavric, "Methylxanthines: toxicity to humans. 3. Theobromine, paraxanthine and the combined effects of methylxanthines." Food and chemical toxicology 26.8 (1988): 725-733.
Strausberg et al., "Directed coevolution of stability and catalytic activity in calcium-free subtilisin." Biochemistry 44.9 (2005): 3272-3279.
Summers et al., "Caffeine junkie: an unprecedented glutathione S-transferase-dependent oxygenase required for caffeine degradation by Pseudomonas putida CBB5." Journal of bacteriology 195.17 (2013): 3933-3939.
Summers et al., "Characterization of a broad-specificity non-haem iron N-demethylase from Pseudomonas putida CBB5 capable of utilizing several purine alkaloids as sole carbon and nitrogen source." Microbiology 157.2 (2011): 583-592.
Summers et al., "New genetic insights to consider coffee waste as feedstock for fuel, feed, and chemicals." Open Chemistry 12.12 (2014): 1271-1279.
Summers et al., "Novel, highly specific N-demethylases enable bacteria to live on caffeine and related purine alkaloids." Journal of bacteriology 194.8 (2012): 2041-2049.
Szadkowska et al., "A theophylline based copper N-heterocyclic carbene complex: synthesis and activity studies in green media." RSC advances 6.50 (2016): 1-8.
Szolomájer et al., "3-Substituted xanthines as promising candidates for quadruplex formation: computational, synthetic and analytical studies." New Journal of Chemistry 35.2 (2011): 475-482.
Thomas, "Hybridization of denatured RNA and small DNA fragments transferred to nitrocellulose." Proceedings of the National Academy of Sciences 77.9 (1980): 5201-5205.
Tovilla-Coutiño et al., "Engineered citrate synthase alters acetate accumulation in *Escherichia coli*." Metabolic Engineering 61 (2020): 1-45.
Trier et al., "Systemic 7-methylxanthine in retarding axial eye growth and myopia progression: a 36-month pilot study." Journal of ocular biology, diseases, and informatics 1 (2008): 85-93.
Valdés et al., "Xanthine based N-heterocyclic carbene (NHC) complexes." Journal of Organometallic Chemistry 867 (2018): 51-54.
Van Gelder et al., "Coffee consumption is inversely associated with cognitive decline in elderly European men: the Fine Study." European journal of clinical nutrition 61.2 (2007): 225-232.

(56) References Cited

OTHER PUBLICATIONS

Wang et al., "The role of enzyme dynamics and tunnelling in catalysing hydride transfer: studies of distal mutants of dihydrofolate reductase." Philosophical Transactions of the Royal Society B: Biological Sciences 361.1472 (2006): 1307-1315.

Watney et al., "Effect of mutation on enzyme motion in dihydrofolate reductase." Journal of the American Chemical Society 125.13 (2003): 3745-3750.

Wu et al., "Engineered citrate synthase improves citramalic acid generation in *Escherichia coli*." Biotechnology and Bioengineering 117.9 (2020): 1-35.

Xu et al., "Neuroprotection by caffeine: time course and role of its metabolites in the MPTP model of Parkinson's disease." Neuroscience 167.2 (2010): 1-14.

Yoneyama et al., "Substrate specificity of N-methyltransferase involved in purine alkaloids synthesis is dependent upon one amino acid residue of the enzyme." Molecular Genetics and Genomics 275 (2006): 125-135.

Yu et al., "Two distinct pathways for metabolism of theophylline and caffeine are coexpressed in Pseudomonas putida CBB5." Journal of bacteriology 191.14 (2009): 4624-4632.

Zavialov et al., "New and practical method for synthesis of 1-and 1, 3-Substituted xanthines." Organic letters 6.13 (2004): 1-45.

Zhang et al., "Caffeine derived platinum (II) N-heterocyclic carbene complexes with multiple anti-cancer activities." Journal of Organometallic Chemistry 782 (2015): 37-41.

Zhang et al., "Introduction of an NADH regeneration system into Klebsiella oxytoca leads to an enhanced oxidative and reductive metabolism of glycerol." Metabolic Engineering 11.2 (2009): 101-106.

KHR Algarrawi, RM Summers, M Subramanian (2017). Production of theobromine by N-demethylation of caffeine using metabolically engineered *E. coli*. Biocatalysis and Agricultural Biotechnology 11:153-160. https://doi.org/10.1016/j.bcab.2017.06.014.

KHR Algarrawi, RM Summers, S Gopishetty, M Subramanian (2015). Direct conversion of theophylline to 3-methylxanthine by metabolically engineered *E. coli*. Microbial Cell Factories 14:203. https://doi.org/10.1186/s12934-015-0395-1.

* cited by examiner

| Strain | Caffeine Consumed (µM) | Rate of Caffeine Consumption (µM/minute) | Percent of Paraxanthine in Products* | Theophylline Consumed (µM) | Rate of Theophylline Consumption (µM/minute) | Percent of 1-Methylxanthine in Products** |
|---|---|---|---|---|---|---|
| dDA | 1109.7 ± 21.9 | 10.3 ± 1.2 | 1.4 ± 0.5 | 830.2 ± 16.1 | 6.7 ± 0.1 | 7.4 ± 0.2 |
| dDA1 | 96.4 ± 78.1 | 0.5 ± 0.5 | 28.9 ± 5.3 | 78.9 ± 26.0 | 0.8 ± 0.3 | 88.1 ± 0.1 |
| dDA2 | 850.5 ± 39.8 | 6.9 ± 0.1 | 5.1 ± 0.3 | 810.4 ± 51.6 | 6.7 ± 0.4 | 17.0 ± 0.1 |
| dDA3 | 185.8 ± 35.1 | 1.4 ± 0.2 | 82.9 ± 0.5 | 784.0 ± 20.6 | 6.4 ± 0.2 | 98.6 ± 0.2 |

FIG. 7

| Strain | Caffeine Consumed (µM) | Paraxanthine in Products (µM) | Molar Yield |
|---|---|---|---|
| dDA | 1109.7 ± 21.9 | 15.9 ± 5.0 | 0.01 ± 0.003 |
| dDA3 | 105.0 ± 16.1 | 92.4 ± 3.1 | 0.77 ± 0.11 |
| dDA4 | 88.6 ± 32.5 | 83.9 ± 3.7 | 0.97 ± 0.32 |

FIG. 8

| Strain Names | Characteristics | Source |
|---|---|---|
| E. coli BL21(DE3) | F- ompT hsdS_B (r_B-m_B-) gal dcm (DE3) | Invitrogen |
| E. coli pDdA | BL21(DE3) pET28-His-ndmD dA | (K. H. Algharrawi et al., 2015) |
| E. coli pDdAA | BL21(DE3) pET28-His-ndmD dAA | (K. H. Algharrawi et al., 2015) |
| E. coli MBM001 | BL21(DE3) pET32-ndmD-His dA0 | This study |
| E. coli MBM002 | BL21(DE3) dDA4 | This study |
| E. coli MBM003 | BL21(DE3) pET28-His-ndmD dA4 | This study |
| E. coli MBM004 | BL21(DE3) pET28-His-ndmD dA4A4 | This study |
| E. coli MBM005 | BL21(DE3) pETDuet-ndmA4 dDD | This study |
| E. coli MBM006 | BL21(DE3) pDP1 dA4 | This study |
| E. coli MBM007 | BL21(DE3) pDP1 dA4A4 | This study |
| E. coli MBM008 | BL21(DE3) pDrbs1A4 | This study |
| E. coli MBM009 | BL21(DE3) pDrbs2A4 | This study |
| E. coli MBM010 | BL21(DE3) pDrbs1A4 dA4A4 | This study |
| E. coli MBM011 | BL21(DE3) pDrbs2A4 dA4A4 | This study |
| E. coli MBM012 | BL21(DE3) pDP1rbs2A4 | This study |
| E. coli MBM013 | BL21(DE3) pDP1rbs2A4 dA4 | This study |
| E. coli MBM014 | BL21(DE3) pDP1rbs2A4 dA4A4 | This study |
| E. coli MBM015 | BL21(DE3) pET28-His-ndmD dAfrmAB | This study |
| E. coli MBM016 | BL21(DE3) pET28-His-ndmD dA4frmAB | This study |
| E. coli MBM017 | BL21(DE3) pDrbs2A4 dA4frmAB | This study |
| E. coli MBM018 | BL21(DE3) pDP1 dA4frmAB | This study |
| E. coli MBM019 | BL21(DE3) pDP1rbs2A4 dA4frmAB | This study |

FIG. 9

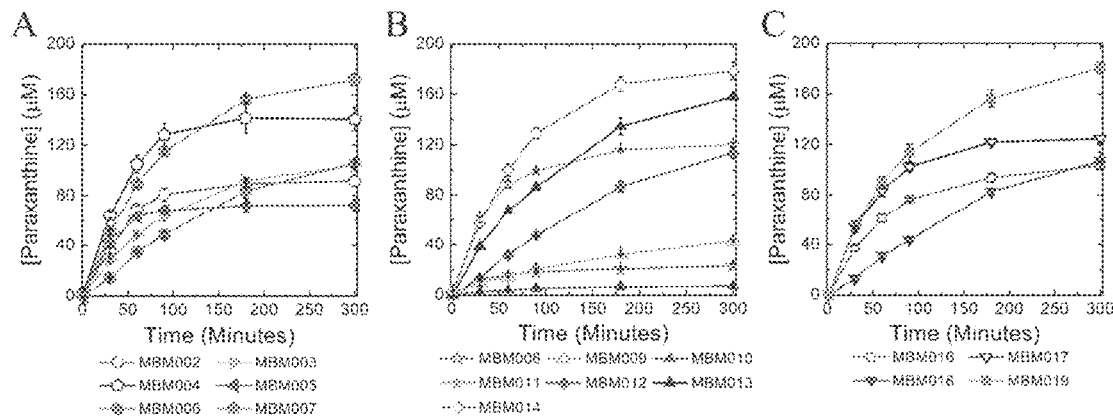

FIGS. 12A-12C

| Strain | Approximate Gene Copy Number | | | Caffeine Consumption | Paraxanthine Production |
|---|---|---|---|---|---|
| | NdmA4 | NdmD/NdmDP1 | NdmD/DP1:NdmA4 ratio | | |
| dDA4 (MBM002) | 10 | 10 | 1 | 169 ± 38 µM | 92 ± 4 µM |
| pDdA4 (MBM003) | 10 | 40 | 4 | 177 ± 13 µM | 104 ± 3 µM |
| pDdA4A4 (MBM004) | 20 | 40 | 2 | 256 ± 47 µM | 141 ± 9 µM |
| pA4dDD (MBM005) | 40 | 20 | 0.5 | 82 ± 27 µM | 73 ± 4 µM |
| pDP1dA4 (MBM006) | 10 | 40 | 4 | 169 ± 10 µM | 106 ± 3 µM |
| pDP1dA4A4 (MBM007) | 20 | 40 | 2 | 279 ± 48 µM | 172 ± 5 µM |
| pDrbs1A4 (MBM008) | 40 | 40 | 1 | 44 ± 17 µM | 23 ± 1 µM |
| pDrbs2A4 (MBM009) | 40 | 40 | 1 | 85 ± 42 µM | 43 ± 1 µM |
| pDrbs1A4dA4A4 (MBM010) | 60 | 40 | 0.667 | 44 ± 22 µM | 7 ± 1 µM |
| pDrbs2A4dA4A4 (MBM011) | 60 | 40 | 0.667 | 187 ± 7 µM | 120 ± 2 µM |
| pDP1rbs2A4 (MBM012) | 40 | 40 | 1 | 200 ± 51 µM | 114 ± 4 µM |
| pDP1rbs2A4dA4 (MBM013) | 50 | 40 | 0.8 | 282 ± 21 µM | 158 ± 2 µM |
| pDP1rbs2A4dA4A4 (MBM014) | 60 | 40 | 0.667 | 283 ± 26 µM | 178 ± 7 µM |
| pDdA4frmAB (MBM016) | 10 | 40 | 4 | 155 ± 26 µM | 104 ± 3 µM |
| pDrbs2A4dA4frmAB (MBM017) | 50 | 40 | 0.8 | 200 ± 36 µM | 125 ± 2 µM |
| pDP1dA4frmAB (MBM018) | 10 | 40 | 4 | 149 ± 23 µM | 107 ± 7 µM |
| pDP1rbs2A4dA4frmAB (MBM019) | 50 | 40 | 0.8 | 273 ± 36 µM | 151 ± 5 µM |

FIG. 13

| OD₆₀₀ | Caffeine Consumed (μM) | Paraxanthine Produced (μM) | 7-Methylxanthine Produced (μM) |
|---|---|---|---|
| 5 | 367 ± 39 | 229 ± 7 | 81 ± 3 |
| 10 | 563 ± 64 | 267 ± 27 | 177 ± 16 |
| 20 | 678 ± 23 | 263 ± 8 | 250 ± 6 |
| 50 | 921 ± 21 | 153 ± 1 | 617 ± 12 |

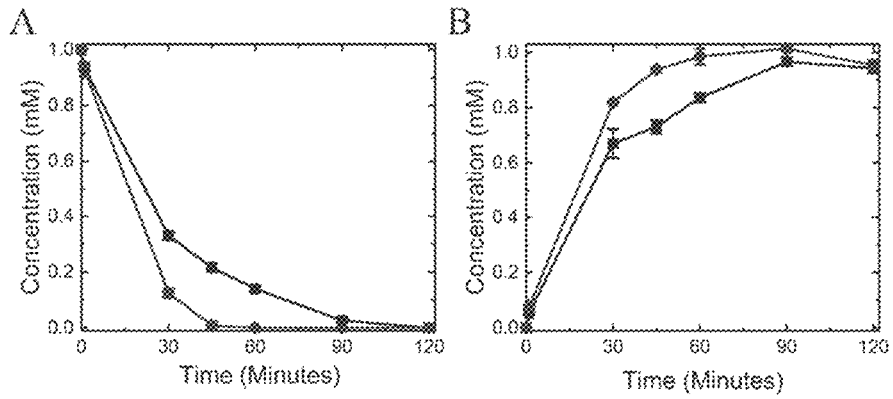

FIGS. 23A-23B

| SEQ ID NO. | Primer Name | Primer Sequence 5' to 3' |
|---|---|---|
| 1 | A-N282Q-F | GATTATCTGCACATTGCATTTCAAGATCTCGTCTTCGCTGAAGAC |
| 2 | A-N282Q-R | GTCTTCAGCGAAGACGAGATCTTGAAATGCAATGTGCAGATAATC |
| 3 | A-F286L-F | GCATTTAATGATCTCGTCTTGGCTGAAGACAAACCAGTAATTG |
| 4 | A-F286L-R | CAATTACTGGTTTGTCTTCAGCCAAGACGAGATCATTAAATGC |
| 5 | A3-N282Q-F | GATTATCTGCACATTGCATTTCAAGATCTCGTCTTGGCTGAAGAC |
| 6 | A3-N282Q-R | GTCTTCAGCCAAGACGAGATCTTGAAATGCAATGTGCAGATAATC |
| 7 | B-L293F-F | GCTTTCCAGAAGCGGGTGTTTGACGAAGACCAGCCTG |
| 8 | B-L293F-R | CAGGCTGGTCTTCGTCAAACACCCGCTTCTGGAAAGC |
| 9 | B-Q289N-F | CACATGCACCTGGCTTTCAACAAGCGGGTGCTTGACGAAG |
| 10 | B-Q289N-R | CTTCGTCAAGCACCCGCTTGTTGAAAGCCAGGTGCATGTG |
| 11 | B3-Q298N-F1 | CACATGCACCTGGCTTTCAACAAGCGGGTGTTTGACGAAG |
| 12 | B3-Q289N-R1 | CTTCGTCAAACACCCGCTTGTTGAAAGCCAGGTGCATGTG |
| 13 | D-V541W-F | GAAGCTTCTTGTGAGCAGGGTTGGTGCGGGACTTGTATAACTCCAG |
| 14 | D-V541W-R | CTGGAGTTATACAAGTCCCGCACCAACCCTGCTCACAAGAAGCTTC |
| 15 | D-V541R-F | GAAGCTTCTTGTGAGCAGGGTCGCTGCGGGACTTGTATAACTCCAG |
| 16 | D-V541R-R | CTGGAGTTATACAAGTCCCGCAGCGACCCTGCTCACAAGAAGCTTC |
| 17 | D-C50A-F | AATGCTTGGGAGAACCGCGCCCCGCATAGAGGATTGCGG |
| 18 | D-C50A-R | CCGCAATCCTCTATGCGGGGCGCGGTTCTCCCAAGCATT |
| 19 | D-C69A-F | GCTAATACCGGTAACGAGTTGCGAGCTCAGTATCATGGATGGACTTATG |
| 20 | D-C69A-R | CATAAGTCCATCCATGATACTGAGCTCGCAACTCGTTACCGGTATTAGC |
| 21 | Loop-F-NdeI | GCACGGCATATGAACAGGCAATCATTAATG |
| 22 | NdmA-R-KpnI | CCTCCGGGTACCTTATARGTAGCTCCTATCGCTT |

FIG. 24

| Strain Name | Strain Characteristics | Source |
|---|---|---|
| E. coli BL21(DE3) | F– ompT hsdSB (rB–mB–) gal dcm (DE3) | Invitrogen |
| E. coli dDA | BL21(DE3) dDA | (Algharrawi et al. 2015) |
| E. coli dDA1 | BL21(DE3) dDA1 | This work |
| E. coli dDA2 | BL21(DE3) dDA2 | This work |
| E. coli dDA3 | BL21(DE3) dDA3 | This work |
| E. coli dDA4 | BL21(DE3) dDA4 | This work |
| E. coli dDB | BL21(DE3) dDB | (Algharrawi and Subramanian 2020) |
| E. coli dDB1 | BL21(DE3) dDB1 | This work |
| E. coli dDB2 | BL21(DE3) dDB2 | This work |
| E. coli dDB3 | BL21(DE3) dDB3 | This work |
| E. coli pDdAA | BL21(DE3) pD dAA | (Algharrawi et al. 2015) |
| E. coli pD1dA | BL21(DE3) pD1 dAA | This work |
| E. coli pD2dAA | BL21(DE3) pD2 dAA | This work |
| E. coli pDWdAA | BL21(DE3) pDW dAA | This work |
| E. coli pDW1dAA | BL21(DE3) pDW1 dAA | This work |
| E. coli pDW2dAA | BL21(DE3) pDW2 dAA | This work |
| E. coli pDRdAA | BL21(DE3) pDR dAA | This work |
| E. coli pDR1dAA | BL21(DE3) pDR1 dAA | This work |
| E. coli pDR2dAA | BL21(DE3) pDR2 dAA | This work |
| E. coli pD1dBB | BL21(DE3) pD1 dBB | This work |
| E. coli pD2dBB | BL21(DE3) pD2 dBB | This work |
| E. coli pDWdBB | BL21(DE3) pDW dBB | This work |
| E. coli pDW1dBB | BL21(DE3) pDW1 dBB | This work |
| E. coli pDW2dBB | BL21(DE3) pDW2 dBB | This work |
| E. coli pDRdBB | BL21(DE3) pDR dBB | This work |
| E. coli pDR1dBB | BL21(DE3) pDR1 dBB | This work |
| E. coli pDR2dBB | BL21(DE3) pDR2 dBB | This work |

FIG. 25

| SEQ ID NO. | Name | Primer Sequence (5'→ 3') |
|---|---|---|
| 23 | Loop-F-NcoI | GCACGGCCATGGAACAGGCAAATCATTAATGATG |
| 24 | Loop-F-NdeI | GCACGGCATATGGAACAGGCAATCATTAATGATG |
| 25 | NdmDP1-GA-F | CTGGTGCCGCGCGGCAGCCATATGACTAAGGCTCCTCCAACCC |
| 26 | NdmDP1-GA-R | GTCGACGGAGCTCGAATTCGGATCCTCACAGATCGAGAACGATTTTTTTG |
| 27 | rbs-Loop-F | CGCGCAAGTCGTTACCAGGAAATTCTATATGGAACAGGCAATCATTAATG |
| 28 | NdmD-rbs-R | ATAGAATTTCCTGGTAACGACTTGCGCGTCACAGATCGAGAACGATTTTT TGGA |
| 29 | NdmD-GA-F | CTGGTGCCGCGCGGCAGCCATATGAACAAACTTGACGTCAACCAGTGG |
| 30 | Loop-GA-R | GTCGACGGAGCTCGAATTCGGATCCTTATATGTAGCTCCTATCGCTT |
| 31 | frmA-F1 | TATTAGTTAAGTATAAGAAGGAGATATACATATGAAATCACGTGCTGCC |
| 32 | frmA_rbs-R1 | CTAGTATTTCTCCTCTTTCTCTAGATCAGTAACGAATTACGGTTC |
| 33 | rbs_frmB-F1 | TCTAGAGAAAGAGGAGAAATACTAGATGGAACTCATTGAAAAACATG |
| 34 | frmB-R1 | GTTTCTTTACCAGACTCGAGGGTACCTCAACGCATATTCAGTTTATTG |
| 35 | NdmA-R-BamHI | CCTCCGGGATCCTTATATGTAGCTCCTATCGCTT |
| 36 | NdmA-R-KpnI | CATGTGCTCATGSCCAAAATCCCTTAACGTGAGTGGCCGCAAATTAAAGCC TTC |
| 37 | NdmD1-F | AGAGAAATCAAATTAAGGAGGTAAGATAAATGAACAAACTTGACGTCAAC |
| 38 | NdmD1-R | CTAGTATTTCTCCTCTTTCTCTAGATCACAGATCGAGAACGATTTTTTGGA C |
| 39 | NdmDP1-GA-F | CTGGTGCCGCGCGGCAGCCATATGACTAAGGCTCCTCCAACCC |
| 40 | NdmDP1-GA-R | GTCGACGGAGCTCGAATTCGGATCCTCACAGATCGAGAACGATTTTTTG |
| 41 | Loop2-F | TCTAGAGAAAGAGGAGAAATACTAGATGGAACAGGCAATCATTAATG |
| 42 | Loop2-R | GCTACTAGTACTCTAGTATCATTACTTATATGTAGCTCCTATCGCTTTCAAT GACTGGG |

FIG. 27

| Name | Characteristics | Source |
|---|---|---|
| Plasmids | | |
| pET-28a(+) | Kan$^R$, T7 promoter, N-terminal His6 tag, pBR322 origin | Novagen |
| pET-32a(+) | Amp$^R$, T7 promoter, C-terminal His6 tag, pBR322 origin | Novagen |
| pETDuet-1 | Amp$^R$, two T7 promoters, two MCS, pBR322 origin | Novagen |
| pACYCDuet-1 | Cm$^R$, two T7 promoters, two MCS, p15A origin | Novagen |
| pET28-His-ndmD | pET-28a(+) with one copy of *ndmD* | (R. M. Summers et al., 2012) |
| pDrbs1A4 | pET-28a(+) with one copy of *ndmD*, one copy of mutant *ndmA4* connected by a ribosomal binding site (1) | This study |
| pDP1 | pET-28a(+) with one copy of truncated *ndmD* (*ndmDP1*) | This study |
| pDrbs2A4 | pET-28a(+) with one copy of *ndmD* and one *ndmA4* connected by a ribosomal binding site (2) | This study |
| pDP1rbs2A4 | pET-28a(+) with one copy of *ndmDP1* and one copy of *ndmA4* connected by a ribosomal binding site (2) | This study |
| p32D | pET-32a(+) with one copy of *ndmD* | This study |
| pA4 | pETDuet with one copy of *ndmA4* | (Kim et al., 2019) |
| dA4 | pACYCDuet-1 with one copy of *ndmA4* spanning both MCS's | This study |
| dDA4 | pACYCDuet-1 with one copy of *ndmD* and one copy of *A4* | This study |
| dDD | pACYCDuet-1 with two copies of *ndmD* | (K. H. Algharrawi et al., 2015) |
| dA4A4 | pACYCDuet-1 with two copies of *ndmA4* | This study |
| dA4frmAB | pACYCDuet-1 with one copy of *ndmA4* and one copy of *frmAB* | This study |
| dA0 | pACYCDuet-1 with one copy of *ndmA* within MCS1, MCS2 empty | (K. H. Algharrawi et al., 2015) |
| dA | pACYCDuet-1 with one copy of *ndmA* | (K. H. Algharrawi et al., 2015) |
| dAA | pACYCDuet-1 with two copies of *ndmA* | (K. H. Algharrawi et al., 2015) |
| dAfrmAB | pACYCDuet-1 with one copy of *ndmA* and one copy of *frmAB* | This study |

FIG. 28

| Plasmid Name | Plasmid Characteristics | Source |
|---|---|---|
| pACYCDuet-1 | P15A origin, two MCS, hexahistidine tag sequence by MCS1, Chloramphenicol resistance | Novagen |
| pETDuet-1 | pBR322 origin, two MCS, hexahistidine tag sequence by MCS1, Ampicillin resistance | Novagen |
| dDA | pACYCDuet-1 with NdmD and NdmA | (Algharrawi et al. 2015) |
| dDB | pACYCDuet-1 with NdmD and NdmB | (Algharrawi and Subramanian 2020) |
| dAA | pACYCDuet-1 with two copies of NdmA | (Algharrawi et al. 2015) |
| dBB | pACYCDuet-1 with two copies of NdmB | (Algharrawi and Subramanian 2020) |
| dDA1 | pACYCDuet-1 with NdmD and with NdmA mutation N282Q | This work |
| dDA2 | pACYCDuet-1 with NdmD and with NdmA mutation F286L | This work |
| dDA3 | pACYCDuet-1 with NdmD and with NdmA mutations N282Q and F286L | This work |
| dDB1 | pACYCDuet-1 with NdmD and with NdmB mutation L293F | This work |
| dDB2 | pACYCDuet-1 with NdmD and with NdmB mutation Q289N | This work |
| dDB3 | pACYCDuet-1 with NdmD and with NdmB mutations L293F and A289N | This work |
| pETDuet-NdmA4 | pETDuet-1 with NdmA4 | (Kim et al. 2019) |
| dDA4 | pACYCDuet-1 with NdmD and NdmA4 | This work |
| pET-28 a (+) | pBR322 origin, Kanamycin resistance | Novagen |
| pD | pET-28 a (+) with NdmD (previously named pET28-His-ndmD) | (Summers et al. 2012) |
| pD1 | pET-28 a (+) with NdmD mutation C69A | This work |
| pD2 | pET-28 a (+) with NdmD mutations C69A and C50A | This work |
| pDW1 | pET-28 a (+) with NdmD mutations C69A and V541W | This work |
| pDW2 | pET-28 a (+) with NdmD mutations C69A, C50A and V541W | This work |
| pDR1 | pET-28 a (+) with NdmD mutations C69A and V541R | This work |
| pDR2 | pET-28 a (+) with NdmD mutations C69A, C50A and V541R | This work |

FIG. 29

```
                              SEQUENCE LISTING

Sequence total quantity: 66
SEQ ID NO: 1             moltype = DNA  length = 45
FEATURE                  Location/Qualifiers
misc_feature             1..45
                         note = Description of sequence: Primer: A-N282Q-F
source                   1..45
                         mol_type = other DNA
                         organism = synthetic construct
SEQUENCE: 1
gattatctgc acattgcatt tcaagatctc gtcttcgctg aagac                45

SEQ ID NO: 2             moltype = DNA  length = 45
FEATURE                  Location/Qualifiers
misc_feature             1..45
                         note = Description of sequence: Primer: A-N282Q-R
source                   1..45
                         mol_type = other DNA
                         organism = synthetic construct
SEQUENCE: 2
gtcttcagcg aagacgagat cttgaaatgc aatgtgcaga taatc                45

SEQ ID NO: 3             moltype = DNA  length = 43
FEATURE                  Location/Qualifiers
misc_feature             1..43
                         note = Description of sequence: Primer: A-F286L-F
source                   1..43
                         mol_type = other DNA
                         organism = synthetic construct
SEQUENCE: 3
gcatttaatg atctcgtctt ggctgaagac aaaccagtaa ttg                  43

SEQ ID NO: 4             moltype = DNA  length = 43
FEATURE                  Location/Qualifiers
misc_feature             1..43
                         note = Description of sequence: Primer: A-F286L-R
source                   1..43
                         mol_type = other DNA
                         organism = synthetic construct
SEQUENCE: 4
caattactgg tttgtcttca gccaagacga gatcattaaa tgc                  43

SEQ ID NO: 5             moltype = DNA  length = 45
FEATURE                  Location/Qualifiers
misc_feature             1..45
                         note = Description of sequence: Primer: A3-N282Q-F
source                   1..45
                         mol_type = other DNA
                         organism = synthetic construct
SEQUENCE: 5
gattatctgc acattgcatt tcaagatctc gtcttggctg aagac                45

SEQ ID NO: 6             moltype = DNA  length = 45
FEATURE                  Location/Qualifiers
misc_feature             1..45
                         note = Description of sequence: Primer: A3-N282Q-R
source                   1..45
                         mol_type = other DNA
                         organism = synthetic construct
SEQUENCE: 6
gtcttcagcc aagacgagat cttgaaatgc aatgtgcaga taatc                45

SEQ ID NO: 7             moltype = DNA  length = 37
FEATURE                  Location/Qualifiers
misc_feature             1..37
                         note = Description of sequence: Primer: B-L293F-F
source                   1..37
                         mol_type = other DNA
                         organism = synthetic construct
SEQUENCE: 7
gctttccaga agcgggtgtt tgacgaagac cagcctg                         37
```

```
SEQ ID NO: 8              moltype = DNA  length = 37
FEATURE                   Location/Qualifiers
misc_feature              1..37
                          note = Description of sequence: Primer: B-L293F-R
source                    1..37
                          mol_type = other DNA
                          organism = synthetic construct
SEQUENCE: 8
caggctggtc ttcgtcaaac acccgcttct ggaaagc                                 37

SEQ ID NO: 9              moltype = DNA  length = 40
FEATURE                   Location/Qualifiers
misc_feature              1..40
                          note = Description of sequence: Primer: B-Q289N-F
source                    1..40
                          mol_type = other DNA
                          organism = synthetic construct
SEQUENCE: 9
cacatgcacc tggctttcaa caagcgggtg cttgacgaag                              40

SEQ ID NO: 10             moltype = DNA  length = 40
FEATURE                   Location/Qualifiers
misc_feature              1..40
                          note = Description of sequence: Primer: B-Q289N-R
source                    1..40
                          mol_type = other DNA
                          organism = synthetic construct
SEQUENCE: 10
cttcgtcaag cacccgcttg ttgaaagcca ggtgcatgtg                              40

SEQ ID NO: 11             moltype = DNA  length = 40
FEATURE                   Location/Qualifiers
misc_feature              1..40
                          note = Description of sequence: Primer: B3-Q298N-F1
source                    1..40
                          mol_type = other DNA
                          organism = synthetic construct
SEQUENCE: 11
cacatgcacc tggctttcaa caagcgggtg tttgacgaag                              40

SEQ ID NO: 12             moltype = DNA  length = 40
FEATURE                   Location/Qualifiers
misc_feature              1..40
                          note = Description of sequence: Primer: B3-Q289N-R1
source                    1..40
                          mol_type = other DNA
                          organism = synthetic construct
SEQUENCE: 12
cttcgtcaaa cacccgcttg ttgaaagcca ggtgcatgtg                              40

SEQ ID NO: 13             moltype = DNA  length = 46
FEATURE                   Location/Qualifiers
misc_feature              1..46
                          note = Description of sequence: Primer: D-V541W-F
source                    1..46
                          mol_type = other DNA
                          organism = synthetic construct
SEQUENCE: 13
gaagcttctt gtgagcaggg ttggtgcggg acttgtataa ctccag                       46

SEQ ID NO: 14             moltype = DNA  length = 46
FEATURE                   Location/Qualifiers
misc_feature              1..46
                          note = Description of sequence: Primer: D-V541W-R
source                    1..46
                          mol_type = other DNA
                          organism = synthetic construct
SEQUENCE: 14
ctggagttat acaagtcccg caccaaccct gctcacaaga agcttc                       46

SEQ ID NO: 15             moltype = DNA  length = 46
FEATURE                   Location/Qualifiers
misc_feature              1..46
                          note = Description of sequence: Primer: D-V541R-F
source                    1..46
                          mol_type = other DNA
                          organism = synthetic construct
SEQUENCE: 15
gaagcttctt gtgagcaggg tcgctgcggg acttgtataa ctccag                       46
```

```
SEQ ID NO: 16              moltype = DNA   length = 46
FEATURE                    Location/Qualifiers
misc_feature               1..46
                           note = Description of sequence: Primer: D-V541R-R
source                     1..46
                           mol_type = other DNA
                           organism = synthetic construct
SEQUENCE: 16
ctggagttat acaagtcccg cagcgaccct gctcacaaga agcttc                    46

SEQ ID NO: 17              moltype = DNA   length = 39
FEATURE                    Location/Qualifiers
misc_feature               1..39
                           note = Description of sequence: Primer: D-C50A-F
source                     1..39
                           mol_type = other DNA
                           organism = synthetic construct
SEQUENCE: 17
aatgcttggg agaaccgcgc cccgcataga ggattgcgg                            39

SEQ ID NO: 18              moltype = DNA   length = 39
FEATURE                    Location/Qualifiers
misc_feature               1..39
                           note = Description of sequence: Primer: D-C50A-R
source                     1..39
                           mol_type = other DNA
                           organism = synthetic construct
SEQUENCE: 18
ccgcaatcct ctatgcgggg cgcggttctc ccaagcatt                            39

SEQ ID NO: 19              moltype = DNA   length = 49
FEATURE                    Location/Qualifiers
misc_feature               1..49
                           note = Description of sequence: Primer: D-C69A-F
source                     1..49
                           mol_type = other DNA
                           organism = synthetic construct
SEQUENCE: 19
gctaataccg gtaacgagtt gcgagctcag tatcatggat ggacttatg                 49

SEQ ID NO: 20              moltype = DNA   length = 49
FEATURE                    Location/Qualifiers
misc_feature               1..49
                           note = Description of sequence: Primer: D-C69A-R
source                     1..49
                           mol_type = other DNA
                           organism = synthetic construct
SEQUENCE: 20
cataagtcca tccatgatac tgagctcgca actcgttacc ggtattagc                 49

SEQ ID NO: 21              moltype = DNA   length = 31
FEATURE                    Location/Qualifiers
misc_feature               1..31
                           note = Description of sequence: Primer: Loop-F-NdeI
source                     1..31
                           mol_type = other DNA
                           organism = synthetic construct
SEQUENCE: 21
gcacggcata tggaacaggc aatcattaat g                                    31

SEQ ID NO: 22              moltype = DNA   length = 34
FEATURE                    Location/Qualifiers
misc_feature               1..34
                           note = Description of sequence: Primer: NdmA-R-KpnI
source                     1..34
                           mol_type = other DNA
                           organism = synthetic construct
SEQUENCE: 22
cctccgggta ccttatargt agctcctatc gctt                                 34

SEQ ID NO: 23              moltype = DNA   length = 34
FEATURE                    Location/Qualifiers
misc_feature               1..34
                           note = Description of sequence: Primer: Loop-F-NcoI
source                     1..34
                           mol_type = other DNA
                           organism = synthetic construct
SEQUENCE: 23
```

```
gcacggccat ggaacaggca aatcattaat gatg                          34

SEQ ID NO: 24           moltype = DNA   length = 34
FEATURE                 Location/Qualifiers
misc_feature            1..34
                        note = Description of sequence: Primer: Loop-F-NdeI
source                  1..34
                        mol_type = other DNA
                        organism = synthetic construct
SEQUENCE: 24
gcacggcata tggaacaggc aatcattaat gatg                          34

SEQ ID NO: 25           moltype = DNA   length = 43
FEATURE                 Location/Qualifiers
misc_feature            1..43
                        note = Description of sequence: Primer: NdmDP1-GA-F
source                  1..43
                        mol_type = other DNA
                        organism = synthetic construct
SEQUENCE: 25
ctggtgccgc gcggcagcca tatgactaag gctcctccaa ccc                43

SEQ ID NO: 26           moltype = DNA   length = 50
FEATURE                 Location/Qualifiers
misc_feature            1..50
                        note = Description of sequence: Primer: NdmDP1-GA-R
source                  1..50
                        mol_type = other DNA
                        organism = synthetic construct
SEQUENCE: 26
gtcgacggag ctcgaattcg gatcctcaca gatcgagaac gatttttttg         50

SEQ ID NO: 27           moltype = DNA   length = 50
FEATURE                 Location/Qualifiers
misc_feature            1..50
                        note = Description of sequence: Primer: rbs-Loop-F
source                  1..50
                        mol_type = other DNA
                        organism = synthetic construct
SEQUENCE: 27
cgcgcaagtc gttaccagga aattctatat ggaacaggca atcattaatg         50

SEQ ID NO: 28           moltype = DNA   length = 55
FEATURE                 Location/Qualifiers
misc_feature            1..55
                        note = Description of sequence: Primer: NdmD-rbs-R
source                  1..55
                        mol_type = other DNA
                        organism = synthetic construct
SEQUENCE: 28
atagaatttc ctggtaacga cttgcgcgtc acagatcgag aacgattttt ttgga   55

SEQ ID NO: 29           moltype = DNA   length = 50
FEATURE                 Location/Qualifiers
misc_feature            1..50
                        note = Description of sequence: Primer: NdmD-GA-F
source                  1..50
                        mol_type = other DNA
                        organism = synthetic construct
SEQUENCE: 29
ctggtgccgc gcgcggcagc catatgaaca aacttgacgt caaccagtgg         50

SEQ ID NO: 30           moltype = DNA   length = 47
FEATURE                 Location/Qualifiers
misc_feature            1..47
                        note = Description of sequence: Primer: Loop-GA-R
source                  1..47
                        mol_type = other DNA
                        organism = synthetic construct
SEQUENCE: 30
gtcgacggag ctcgaattcg gatccttata tgtagctcct atcgctt            47

SEQ ID NO: 31           moltype = DNA   length = 49
FEATURE                 Location/Qualifiers
misc_feature            1..49
                        note = Description of sequence: Primer: frmA-F1
source                  1..49
                        mol_type = other DNA
                        organism = synthetic construct
```

```
SEQUENCE: 31
tattagttaa gtataagaag gagatataca tatgaaatca cgtgctgcc              49

SEQ ID NO: 32          moltype = DNA   length = 45
FEATURE                Location/Qualifiers
misc_feature           1..45
                       note = Description of sequence: Primer: frmA_rbs-R1
source                 1..45
                       mol_type = other DNA
                       organism = synthetic construct
SEQUENCE: 32
ctagtatttc tcctctttct ctagatcagt aacgaattac ggttc                  45

SEQ ID NO: 33          moltype = DNA   length = 47
FEATURE                Location/Qualifiers
misc_feature           1..47
                       note = Description of sequence: Primer: rbs_frmB-F1
source                 1..47
                       mol_type = other DNA
                       organism = synthetic construct
SEQUENCE: 33
tctagagaaa gaggagaaat actagatgga actcattgaa aaacatg                47

SEQ ID NO: 34          moltype = DNA   length = 48
FEATURE                Location/Qualifiers
misc_feature           1..48
                       note = Description of sequence: Primer: frmB-R1
source                 1..48
                       mol_type = other DNA
                       organism = synthetic construct
SEQUENCE: 34
gtttctttac cagactcgag ggtacctcaa cgcatattca gtttattg               48

SEQ ID NO: 35          moltype = DNA   length = 34
FEATURE                Location/Qualifiers
misc_feature           1..34
                       note = Description of sequence: Primer: NdmA-R-BamHI
source                 1..34
                       mol_type = other DNA
                       organism = synthetic construct
SEQUENCE: 35
cctccgggat ccttatatgt agctcctatc gctt                              34

SEQ ID NO: 36          moltype = DNA   length = 54
FEATURE                Location/Qualifiers
misc_feature           1..54
                       note = Description of sequence: Primer: NdmA-R-KpnI
source                 1..54
                       mol_type = other DNA
                       organism = synthetic construct
SEQUENCE: 36
catstgctca tgsccaaaat cccttaacgt gagtggccgc aaattaaagc cttc        54

SEQ ID NO: 37          moltype = DNA   length = 50
FEATURE                Location/Qualifiers
misc_feature           1..50
                       note = Description of sequence: Primer: NdmD1-F
source                 1..50
                       mol_type = other DNA
                       organism = synthetic construct
SEQUENCE: 37
agagaaatca aattaaggag gtaagataaa tgaacaaact tgacgtcaac             50

SEQ ID NO: 38          moltype = DNA   length = 53
FEATURE                Location/Qualifiers
misc_feature           1..53
                       note = Description of sequence: Primer: NdmD1-R
source                 1..53
                       mol_type = other DNA
                       organism = synthetic construct
SEQUENCE: 38
ctagtatttc tcctctttct ctagatcaca gatcgagaac gattttttg gac          53

SEQ ID NO: 39          moltype = DNA   length = 43
FEATURE                Location/Qualifiers
misc_feature           1..43
                       note = Description of sequence: Primer: NdmDP1-GA-F
source                 1..43
                       mol_type = other DNA
```

```
                                  organism = synthetic construct
SEQUENCE: 39
ctggtgccgc gcggcagcca tatgactaag gctcctccaa ccc                          43

SEQ ID NO: 40               moltype = DNA   length = 50
FEATURE                     Location/Qualifiers
misc_feature                1..50
                            note = Description of sequence: Primer: NdmDP1-GA-R
source                      1..50
                            mol_type = other DNA
                            organism = synthetic construct
SEQUENCE: 40
gtcgacggag ctcgaattcg gatcctcaca gatcgagaac gatttttttg                   50

SEQ ID NO: 41               moltype = DNA   length = 47
FEATURE                     Location/Qualifiers
misc_feature                1..47
                            note = Description of sequence: Primer: Loop2-F
source                      1..47
                            mol_type = other DNA
                            organism = synthetic construct
SEQUENCE: 41
tctagagaaa gaggagaaat actagatgga acaggcaatc attaatg                      47

SEQ ID NO: 42               moltype = DNA   length = 59
FEATURE                     Location/Qualifiers
misc_feature                1..59
                            note = Description of sequence: Primer: Loop2-R
source                      1..59
                            mol_type = other DNA
                            organism = synthetic construct
SEQUENCE: 42
gctactagta ctctagtatc attacttata tgtagctcct atcgctttca atgactggg         59

SEQ ID NO: 43               moltype = DNA   length = 45
FEATURE                     Location/Qualifiers
source                      1..45
                            mol_type = other DNA
                            organism = synthetic construct
SEQUENCE: 43
gattatctgc acattgcatt tcaagatctc gtcttcgctg aagac                        45

SEQ ID NO: 44               moltype = DNA   length = 45
FEATURE                     Location/Qualifiers
source                      1..45
                            mol_type = other DNA
                            organism = synthetic construct
SEQUENCE: 44
gtcttcagcg aagacgagat cttgaaatgc aatgtgcaga taatc                        45

SEQ ID NO: 45               moltype = DNA   length = 43
FEATURE                     Location/Qualifiers
source                      1..43
                            mol_type = other DNA
                            organism = synthetic construct
SEQUENCE: 45
gcatttaatg atctcgtctt ggctgaagac aaaccagtaa ttg                          43

SEQ ID NO: 46               moltype = DNA   length = 43
FEATURE                     Location/Qualifiers
source                      1..43
                            mol_type = other DNA
                            organism = synthetic construct
SEQUENCE: 46
caattactgg tttgtcttca gccaagacga gatcattaaa tgc                          43

SEQ ID NO: 47               moltype = DNA   length = 45
FEATURE                     Location/Qualifiers
source                      1..45
                            mol_type = other DNA
                            organism = synthetic construct
SEQUENCE: 47
gattatctgc acattgcatt tcaagatctc gtcttggctg aagac                        45

SEQ ID NO: 48               moltype = DNA   length = 45
FEATURE                     Location/Qualifiers
source                      1..45
                            mol_type = other DNA
                            organism = synthetic construct
```

```
SEQUENCE: 48
gtcttcagcc aagacgagat cttgaaatgc aatgtgcaga taatc                            45

SEQ ID NO: 49              moltype = DNA   length = 37
FEATURE                    Location/Qualifiers
source                     1..37
                           mol_type = other DNA
                           organism = synthetic construct
SEQUENCE: 49
gctttccaga agcgggtgtt tgacgaagac cagcctg                                     37

SEQ ID NO: 50              moltype = DNA   length = 37
FEATURE                    Location/Qualifiers
source                     1..37
                           mol_type = other DNA
                           organism = synthetic construct
SEQUENCE: 50
caggctggtc ttcgtcaaac acccgcttct ggaaagc                                     37

SEQ ID NO: 51              moltype = DNA   length = 40
FEATURE                    Location/Qualifiers
source                     1..40
                           mol_type = other DNA
                           organism = synthetic construct
SEQUENCE: 51
cacatgcacc tggctttcaa caagcgggtg cttgacgaag                                  40

SEQ ID NO: 52              moltype = DNA   length = 40
FEATURE                    Location/Qualifiers
source                     1..40
                           mol_type = other DNA
                           organism = synthetic construct
SEQUENCE: 52
cttcgtcaag cacccgcttg ttgaaagcca ggtgcatgtg                                  40

SEQ ID NO: 53              moltype = DNA   length = 40
FEATURE                    Location/Qualifiers
source                     1..40
                           mol_type = other DNA
                           organism = synthetic construct
SEQUENCE: 53
cacatgcacc tggctttcaa caagcgggtg tttgacgaag                                  40

SEQ ID NO: 54              moltype = DNA   length = 40
FEATURE                    Location/Qualifiers
source                     1..40
                           mol_type = other DNA
                           organism = synthetic construct
SEQUENCE: 54
cttcgtcaaa cacccgcttg ttgaaagcca ggtgcatgtg                                  40

SEQ ID NO: 55              moltype = DNA   length = 46
FEATURE                    Location/Qualifiers
source                     1..46
                           mol_type = other DNA
                           organism = synthetic construct
SEQUENCE: 55
gaagcttctt gtgagcaggg ttggtgcggg acttgtataa ctccag                           46

SEQ ID NO: 56              moltype = DNA   length = 46
FEATURE                    Location/Qualifiers
source                     1..46
                           mol_type = other DNA
                           organism = synthetic construct
SEQUENCE: 56
ctggagttat acaagtcccg caccaaccct gctcacaaga agcttc                           46

SEQ ID NO: 57              moltype = DNA   length = 45
FEATURE                    Location/Qualifiers
source                     1..45
                           mol_type = other DNA
                           organism = synthetic construct
SEQUENCE: 57
gaagcttctt gtgagcaggg tcgctgcgga cttgtataac tccag                            45

SEQ ID NO: 58              moltype = DNA   length = 46
FEATURE                    Location/Qualifiers
source                     1..46
                           mol_type = other DNA
```

```
                        organism = synthetic construct
SEQUENCE: 58
ctggagttat acaagtcccg cagcgaccct gctcacaaga agcttc             46

SEQ ID NO: 59           moltype = DNA  length = 39
FEATURE                 Location/Qualifiers
source                  1..39
                        mol_type = other DNA
                        organism = synthetic construct
SEQUENCE: 59
aatgcttggg agaaccgcgc cccgcataga ggattgcgg                     39

SEQ ID NO: 60           moltype = DNA  length = 33
FEATURE                 Location/Qualifiers
source                  1..33
                        mol_type = other DNA
                        organism = synthetic construct
SEQUENCE: 60
ccgcaatcgc ggggcgcggt tctcccaagc att                           33

SEQ ID NO: 61           moltype = DNA  length = 49
FEATURE                 Location/Qualifiers
source                  1..49
                        mol_type = other DNA
                        organism = synthetic construct
SEQUENCE: 61
gctaataccg gtaacgagtt gcgagctcag tatcatggat ggacttatg          49

SEQ ID NO: 62           moltype = DNA  length = 49
FEATURE                 Location/Qualifiers
source                  1..49
                        mol_type = other DNA
                        organism = synthetic construct
SEQUENCE: 62
cataagtcca tccatgatac tgagctcgca actcgttacc ggtattagc          49

SEQ ID NO: 63           moltype = DNA  length = 31
FEATURE                 Location/Qualifiers
source                  1..31
                        mol_type = other DNA
                        organism = synthetic construct
SEQUENCE: 63
gcacggcata tggaacaggc aatcattaat g                             31

SEQ ID NO: 64           moltype = DNA  length = 34
FEATURE                 Location/Qualifiers
source                  1..34
                        mol_type = other DNA
                        organism = synthetic construct
SEQUENCE: 64
cctccgggta ccttatargt agctcctatc gctt                          34

SEQ ID NO: 65           moltype = DNA  length = 25
FEATURE                 Location/Qualifiers
misc_feature            1..25
                        note = Description of sequence: ribosomal binding site
                        (rbs1)
source                  1..25
                        mol_type = other DNA
                        organism = synthetic construct
SEQUENCE: 65
tctagagaaa gaggagaaat actag                                    25

SEQ ID NO: 66           moltype = DNA  length = 28
FEATURE                 Location/Qualifiers
misc_feature            1..28
                        note = Description of sequence: ribosomal binding site
                        (rbs2)
source                  1..28
                        mol_type = other DNA
                        organism = synthetic construct
SEQUENCE: 66
cgcgcaagtc gttaccagga aattctat                                 28
```

BACTERIAL N-DEMTHYLASES AS BIOCATALYSTS FOR THE PRODUCTION OF METHYLXANTHINES

CROSS REFERENCE TO RELATED APPLICATIONS

This application claims the benefit of priority to U.S. Provisional Application No. 63/230,466, filed Aug. 6, 2021, which is incorporated by reference herein in its entirety.

REFERENCE TO SEQUENCE LISTING

A Sequence Listing conforming to the rules of WIP Standard ST.26 is hereby incorporated by reference. Said Sequence Listing has been filed as an electronic document via EFS-Web in ASCII format encoded as XML. The electronic document, created on Jan. 6, 2023, is entitled "10025-289US1.xml", and is 78,679 bytes in size.

TECHNICAL FIELD

The present disclosure relates to mutant enzymes and bacterial strains constructed to produce paraxanthine and 7-methylxanthine from caffeine and methods for the manufacture and use thereof.

BACKGROUND

Methylxanthines have been used in the pharmaceutical industry for over 100 years, beginning with the use of theophylline as a diuretic and later as an asthma treatment. Since then, the use of caffeine (1,3,7-trimethylxanthine), theophylline (1,3-dimethylxanthine), and theobromine (3,7-dimethylxanthine) has only grown more common. The majority of therapeutic applications for these methylxanthines have been to target the central nervous, cardiovascular, and respiratory systems, and to serve as smooth muscle relaxants. Studies have determined that a habitual intake of caffeine and related methylxanthines can lead to a lower risk of developing Alzheimer's disease, depression, and stroke, among other benefits. The low toxicity and important biological effects of methylxanthines make them an ideal group of candidates for therapeutics.

One methylxanthine with interesting therapeutic applications is paraxanthine (1,7-dimethylxanthine). Research has shown that paraxanthine may reduce the risk of developing Parkinson's disease by protecting nigrostriatal dopaminergic neurons, acting as a stimulant for the central nervous system, and aiding in the treatment of human liver fibrosis. In rodents, Okuro et al. demonstrated that paraxanthine contained lower toxicity and did not increase anxiety levels when compared with caffeine. However, despite these benefits, a major challenge for the implementation of paraxanthine as a therapeutic is that there are few viable industrial-scale production options, which results in a high cost of paraxanthine.

There are limited natural resources available to generate and harvest paraxanthine because it is not produced at significant quantities in plants. Naturally, paraxanthine is found as a caffeine metabolite in humans, as approximately 84% of ingested caffeine is converted into paraxanthine before being metabolized further. The current chemically synthetic process employed to generate methylxanthines is not optimal because selective alkylation of the nitrogen atoms is difficult to control, toxic, and costly. In place of a synthetic chemistry procedure, there is a need to develop a biocatalysis to produce paraxanthine through biotransformation of caffeine. Biotransformations have numerous advantages in that they are cost-effective, less energy demanding, eco-friendly, and non-hazardous, while also providing improved selectivity with operation at ambient temperatures. The compositions and methods address these and other needs.

SUMMARY

In accordance with the purposes of the disclosed materials and methods, as embodied and broadly described herein, the disclosed subject matter, in one aspect, relates to compounds, compositions and methods of making and using compounds and compositions. In a specific aspect, the disclosed subject matter relates to mutant enzymes and bacterial strains constructed to produce paraxanthine and 7-methylxanthine from caffeine and methods for the manufacture and use thereof.

The present disclosure addresses at least a portion of the problems described above through the construction and screening of several *Escherichia coli* strains to produce paraxanthine from caffeine using whole-cell biocatalysts using varying dosages of ndmA4, ndmD, and the frmAB formaldehyde dehydrogenase genes.

In one aspect, the present invention provides: A method of preparing paraxanthine (1,7-dimethylxanthine) and/or 7-methylxanthine, comprising: contacting a bacterial strain expressing a N-demethylase mutant reductase with caffeine, theobromine, or theophylline.

Additional aspects and advantages of the disclosure will be set forth, in part, in the detailed description and any claims which follow, and in part will be derived from the detailed description or can be learned by practice of the various aspects of the disclosure. The advantages described below will be realized and attained by means of the elements and combinations particularly pointed out in the appended claims. It is to be understood that both the foregoing general description and the following detailed description are exemplary and explanatory only and are not restrictive of the disclosure.

BRIEF DESCRIPTION OF THE FIGURES

The accompanying drawings, which are incorporated in and constitute a part of this specification, illustrate certain examples of the present disclosure and together with the description, serve to explain, without limitation, the principles of the disclosure. Like numbers represent the same elements throughout the figures.

(FIG. 2F) Degradation of theophylline. ■, NdmA control; ●, NdmA1; ▲, NdmA2; ▼, NdmA3. Cells ($OD_{600}$=5.0) were incubated with 1 mM caffeine or theophylline or 0.35 mM theobromine in 50 mM KP; buffer at 30° C. with 200 rpm shaking, and metabolites were quantified by HPLC. Concentrations reported are means with standard deviations of triplicate results.

(FIG. 4C) NdmA4 cells are also capable of consuming theophylline (▶) and theobromine (◀). Concentrations reported are means with standard deviations of triplicate results.

FIG. 7 is a table of the comparison of methylxanthine consumption for NdmA and each NdmA mutant after two hours.

FIG. 8 is a table of the comparison of paraxanthine production over two hours by whole cells containing NdmA, NdmA3, and NdmA4.

FIG. 9 is a table of the complete list of strains used in the study.

FIGS. 12A-12C show the production of paraxanthine from caffeine by metabolically engineered E. coli. Concentrations reported are means with standard deviations of triplicate results.

FIG. 13 is a table of the estimated copy number of ndmA4, ndmD and ndmDP1 genes in strains used in the study. Caffeine consumption and subsequent paraxanthine production for all strains from resting cell assays at 1 mM caffeine and an $OD_{600}$ of 5. Caffeine and paraxanthine values reported are the averages of three replicates with standard deviations in samples taken after five hours of reaction.

FIGS. 23A-23B show (FIG. 23A) caffeine consumption and (FIG. 23B) theobromine production by resting cells of E. coli strains pDdA (■) and pDdAA (●). Error bars in all graphs represent standard deviations of triplicate results.

FIG. 24 is a table of all primer sequences used in the plasmid construction for this study.

FIG. 25 is a table of all strains created and tested in the study.

FIG. 27 is a table of the primers used in plasmid construction.

FIG. 28 is a table of the complete list of plasmids used in the study.

FIG. 29 is a table of all plasmids created and tested in the study.

DETAILED DESCRIPTION

Figure 1:
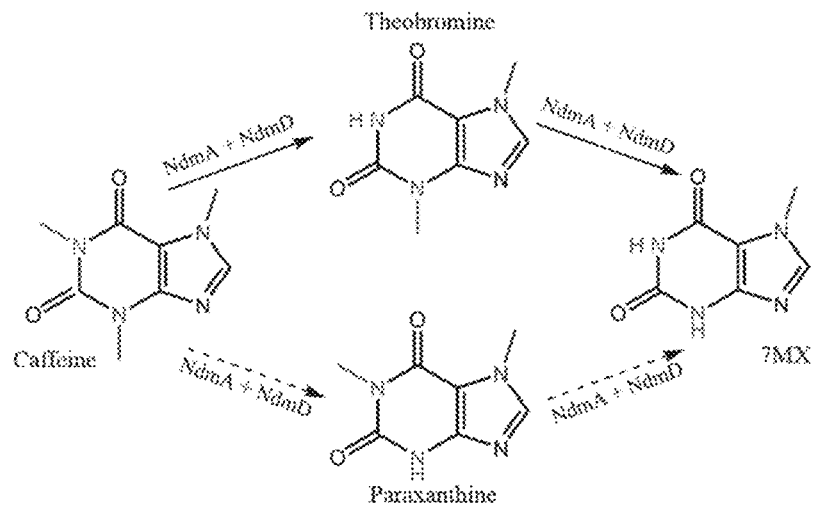
FIG. 1 shows the N-demethylation pathway of caffeine to 7-methylxanthine (7MX) performed by NdmA and NdmB with the partnering reductase NdmD. Continuous lines show the preferred pathway while the dashed lines indicate an alternative route.

The materials, compounds, compositions, and methods described herein may be understood more readily by reference to the following detailed description of specific aspects of the disclosed subject matter and the Examples included therein.

Before the present materials, compounds, compositions, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

The following description of the disclosure is provided as an enabling teaching of the disclosure in its best, currently known embodiment. To this end, those skilled in the relevant art will recognize and appreciate that many changes can be made to the various embodiments of the invention described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

Definitions

In this specification and in the claims which follow, reference will be made to a number of terms which shall be defined to have the following meanings:

Throughout the specification and claims the word "comprise" and other forms of the word, such as "comprising" and "comprises," means including but not limited to, and is not intended to exclude, for example, other additives, components, integers, or steps.

As used herein, the singular forms "a," "an" and "the" include plural referents unless the context clearly dictates otherwise. Thus, for example, reference to a "metal" includes examples having two or more such "metals" unless the context clearly indicates otherwise.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. When such a range is expressed, another example includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

The terms "express" and "expression" mean allowing or causing the information in a gene or DNA sequence to become manifest, for example producing a protein by activating the cellular functions involved in transcription and translation of a corresponding gene or DNA sequence. A DNA sequence is expressed in or by a cell to form an "expression product" such as a protein. The expression product itself, e.g,. the resulting protein, may also be said to be "expressed" by the cell. An expression product can be characterized as intracellular, extracellular or secreted. The term "intracellular" means something that is inside a cell. The term "extracellular" means something that is outside a cell. A substance is "secreted" by a cell if it appears in significant measure outside the cell, from somewhere on or inside the cell.

As used herein, the terms "mutant" and "mutation" refer to any detectable change in genetic material (e.g., DNA) or any process, mechanism, or result of such a change. This includes gene mutations, in which the structure (e.g., DNA sequence) of a gene is altered, any gene or DNA arising from any mutation process, and any expression product (e.g., protein or enzyme) expressed by a modified gene or DNA sequence. As used herein, the term "mutating" refers to a process of creating a mutant or mutation.

The term "amino acid" refers to naturally occurring and synthetic amino acids, as well as amino acid analogs and amino acid mimetics that function in a manner similar to the naturally occurring amino acids. Naturally occurring amino acids are those encoded by the genetic code, as well as those amino acids that are later modified, e.g., hydroxyproline, γ-carboxyglutamate, and O-phosphoserine. Amino acid analogs refers to compounds that have the same basic chemical structure as a naturally occurring amino acid, i.e., an α carbon that is bound to a hydrogen, a carboxyl group, an amino group, and an R group, e.g., homoserine, norleucine, methionine sulfoxide, methionine methyl sulfonium. Such analogs have modified R groups (e.g., norleucine) or modified peptide backbones, but retain the same basic chemical structure as a naturally occurring amino acid. One amino acid that may be used in particular is citrulline, which is a precursor to arginine and is involved in the formation of urea in the liver. Amino acid mimetics refers to chemical compounds that have a structure that is different from the general chemical structure of an amino acid, but functions in a manner similar to a naturally occurring amino acid. The term "unnatural amino acid" is intended to represent the "D" stereochemical form of the twenty naturally occurring amino acids described above. It is further understood that the term unnatural amino acid includes homologues of the natural amino acids, and synthetically modified forms of the natural amino acids. The synthetically modified forms include, but are not limited to, amino acids having alkylene chains shortened or lengthened by up to two carbon atoms, amino acids comprising optionally substituted aryl groups, and amino acids comprised halogenated groups, preferably halogenated alkyl and aryl groups.

Examples of suitable amino acids include, but are not limited to, alanine, allosoleucine, arginine, asparagine, aspartic acid, cysteine, glutamine, glutamic acid, glycine, histidine, isoleucine, leucine, lysine, methionine, napthylalanine, phenylalanine, proline, pyroglutamic acid, serine, threonine, tryptophan, tyrosine, valine, a derivative, or combinations thereof. These are listed in the Table 1 along with their abbreviations used herein.

TABLE 1

Amino Acid Abbreviations

| Amino Acid | Abbreviations* L-amino acid | Abbreviations* D-amino acid |
|---|---|---|
| Alanine | Ala (A) | ala (a) |
| Allosoleucine | AIle | aile |
| Arginine | Arg (R) | arg (r) |
| Asparagine | Asn (N) | asn (n) |
| aspartic acid | Asp (D) | asp (d) |
| Cysteine | Cys (C) | cys (c) |
| Cyclohexylalanine | Cha | cha |
| 2,3-diaminopropionic acid | Dap | dap |
| 4-fluorophenylalanine | Fpa (Σ) | pfa |
| glutamic acid | Glu (E) | glu (e) |
| glutamine | Gln (Q) | gln (q) |
| glycine | Gly (G) | gly (g) |
| histidine | His (H) | his (h) |
| Homoproline (aka pipecolic acid) | Pip (Θ) | pip (θ) |
| isoleucine | Ile (I) | ile (i) |
| leucine | Leu (L) | leu (l) |
| lysine | Lys (K) | lys (k) |
| methionine | Met (M) | met (m) |
| napthylalanine | Nal (Φ) | nal (φ) |
| norleucine | Nle (Ω) | nle |

TABLE 1-continued

Amino Acid Abbreviations

| Amino Acid | Abbreviations* L-amino acid | Abbreviations* D-amino acid |
|---|---|---|
| phenylalanine | Phe (F) | phe (F) |
| phenylglycine | Phg (Ψ) | phg |
| 4-(phosphonodifluoromethyl) phenylalanine | F$_2$Pmp (Λ) | f$_2$pmp |
| proline | Pro (P) | pro (p) |
| sarcosine | Sar (Ξ) | sar |
| selenocysteine | Sec (U) | sec (u) |
| serine | Ser (S) | ser (s) |
| threonine | Thr (T) | thr (y) |
| tyrosine | Tyr (Y) | tyr (y) |
| tryptophan | Trp (W) | trp (w) |
| Valine | Val (V) | val (v) |
| 2,3-diaminopropionic acid | Dap | dap |

*single letter abbreviations: when shown in capital letters herein it indicates the L-amino acid form, when shown in lower case herein it indicates the D-amino acid form Peptides, proteins, and peptide variants are polymers of amino acids and are well understood to those of skill in the art and can involve amino acid sequence modifications. For example, amino acid sequence modifications typically fall into one or more of three classes: substitutional, insertional, or deletional variants. Insertions include amino and/or carboxyl terminal fusions as well as intrasequence insertions of single or multiple amino acid residues. Insertions ordinarily will be smaller insertions than those of amino or carboxyl terminal fusions, for example, on the order of 1 to 3 residues. Deletions are characterized by the removal of one or more amino acid residues from the peptide sequence. Typically, no more than from 1 to 3 residues are deleted at any one site within the peptide. Amino acid substitutions are typically of single residues, but can occur at a number of different locations at once; insertions usually will be on the order of about from 1 to 3 amino acid residues; and deletions will range about from 1 to 3 residues. Deletions or insertions preferably are made in adjacent pairs, i.e. a deletion of 2 residues or insertion of 2 residues. Substitutions, deletions, insertions or any combination thereof can be combined to arrive at a final construct. Substitutional variants are those in which at least one residue has been removed and a different residue inserted in its place. Such substitutions generally are made in accordance with the following Table 2 and are referred to as conservative substitutions.

TABLE 2

Amino Acid Substitutions
Exemplary Conservative Substitutions

| | |
|---|---|
| Ala replaced by Ser | Leu replaced by Ile or Val |
| Arg replaced by Lys or Gln | Lys replaced by Arg or Gln |
| Asn replaced by Gln or His | Met replaced by Leu or Ile |
| Asp replaced by Glu | Phe replaced by Met, Leu, Nal, Phg, or Tyr |
| Cys replaced by Ser | Ser replaced by Thr |
| Gln replaced by Asn or Lys | Thr replaced by Ser |
| Glu replaced by Asp | Trp replaced by Tyr |
| Gly replaced by Pro | Tyr replaced by Trp or Phe |
| His replaced by Asn or Gln | Val replaced by Ile or Leu |
| Ile replaced by Leu or Val | |

Substantial changes in function are made by selecting substitutions that are less conservative than those in Table 2, i.e., selecting residues that differ more significantly in their effect on maintaining (a) the structure of the peptide backbone in the area of the substitution, for example as a sheet or helical conformation, (b) the charge or hydrophobicity of the molecule at the target site or (c) the bulk of the side chain. The substitutions which in general are expected to produce the greatest changes in the protein properties will be those in which (a) a hydrophilic residue, e.g., seryl or threonyl, is substituted for (or by) a hydrophobic residue, e.g., leucyl, isoleucyl, phenylalanyl, valyl or alanyl; (b) a cysteine or proline is substituted for (or by) any other residue; (c) a residue having an electropositive side chain, e.g., lysyl, arginyl, or histidyl, is substituted for (or by) an electronegative residue, e.g., glutamyl or aspartyl; or (d) a residue having a bulky side chain, e.g., phenylalanine, is substituted for (or by) one not having a side chain, e.g., glycine, in this case, (e) by increasing the number of sites for sulfation and/or glycosylation.

For example, the replacement of one amino acid residue with another that is biologically and/or chemically similar is known to those skilled in the art as a conservative substitution. For example, a conservative substitution would be replacing one hydrophobic residue for another, or one polar residue for another. The substitutions include combinations such as, for example, Gly, Ala; Val, Ile, Leu; Asp, Glu; Asn, Gln; Ser, Thr; Lys, Arg; and Phe, Tyr. Such conservatively substituted variations of each explicitly disclosed sequence are included within the peptides provided herein.

Disclosed are the components to be used to prepare the disclosed compositions as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. For example, if a particular electrode is disclosed and discussed and a number of modifications that can be made to the electrode are discussed, specifically contemplated is each and every combination and permutation of the electrode and the modifications that are possible unless specifically indicated to the contrary. Thus, if a class of electrodes A, B, and C are disclosed as well as a class of electrodes D, E, and F and an example of a combination electrode, or, for example, a combination electrode comprising A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the disclosed compositions. Thus, if there are a variety of additional steps that can be performed it is understood that each of these additional steps can be performed with any specific embodiment or combination of embodiments of the disclosed methods.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

Disclosed herein is a method for biocatalytic production of paraxanthine (1,7-dimethylxanthine) and/or 7-methylxanthine, using a modified bacterial strain containing N-demethylase mutant reductase e.g., *E. coli* strain MBM019. The strain can be contacted with caffeine, theobromine, or theophylline to produce paraxanthine (1,7-dimethylxanthine) and/or 7-methylxanthine, which can be isolated.

To prepare modified bacterial strains, the heterologous nucleic acid (e.g., cDNA or genomic DNA) is suitably inserted into a replicable vector for expression in the bacterium under the control of a suitable promoter for bacteria. Many vectors are available for this purpose, and selection of the appropriate vector will depend mainly on the size of the nucleic acid to be inserted into the vector and the particular host cell to be transformed with the vector. Each vector contains various components depending on its function (amplification of DNA or expression of DNA) and the particular host cell with which it is compatible. The vector components for bacterial transformation may include a signal sequence for the heterologous polypeptide and will include a signal sequence for the DNA-digesting protein and will also include an inducible promoter for the heterologous polypeptide and gene t and an inducible promoter or a non-inducible one with low basal expression for the other lytic enzymes. They also generally include an origin of replication and one or more marker genes.

In general, plasmid vectors containing replicon and control sequences that are derived from species compatible with the host cell are used in connection with bacterial hosts. The vector ordinarily carries a replication site, as well as marking sequences that are capable of providing phenotypic selection in transformed cells. For example, *E. coli* can be transformed using pBR322, a plasmid derived from an *E. coli* species. See, e.g., Bolivar et al., *Gene*, 2:95 (1977). pBR322 contains genes conferring ampicillin and tetracycline resistance and thus provides an easy means for identifying transformed cells. The pBR322 plasmid, or other microbial plasmid or phage, also generally contains, or is modified to contain, promoters that can be used by the bacterial organism for expression of the selectable marker genes.

Expression vectors contain a nucleic acid sequence that enables the vector to replicate in one or more selected host cells. Such sequences are well known for a variety of bacteria. The origin of replication from the plasmid pBR322 is suitable for most Gram-negative bacteria.

Expression vectors also generally contain a selection gene, also termed a selectable marker. This gene encodes a protein necessary for the survival or growth of transformed host cells grown in a selective culture medium. Host cells not transformed with the vector containing the selection gene will not survive in the culture medium. Typical selection genes encode proteins that (a) confer resistance to antibiotics or other toxins, e.g., ampicillin, neomycin, methotrexate, or tetracycline, (b) complement auxotrophic deficiencies, or (c) supply critical nutrients not available from complex media, e.g., the gene encoding D-alanine racemase for Bacilli. One example of a selection scheme utilizes a drug to arrest growth of a host cell. Those cells that are successfully transformed with a heterologous gene produce a protein conferring drug resistance and thus survive the selection regimen.

The expression vector for producing a heterologous polypeptide also contains an inducible promoter that is recognized by the host bacterial organism and is operably linked to the nucleic acid encoding the heterologous polypeptide of interest. It also contains a separate inducible or low-basal-expression promoter operably linked to the nucleic acid encoding the lytic enzymes. Inducible promoters suitable for use with bacterial hosts include the .beta.-lactamase and lactose promoter systems (Chang et al., *Nature*, 275:615 (1978); Goeddel et al., *Nature*, 281:544 (1979)), the arabinose promoter system, including the araBAD promoter (Guzman et al., *J. Bacteriol.*, 174:7716-7728 (1992); Guzman et al., *J. Bacteriol.*, 177:4121-4130 (1995); Siegele and Hu, *Proc. Natl. Acad. Sci.* USA, 94:8168-8172 (1997)), the rhamnose promoter (Haldimann et al., *J. Bacteriol.*, 180: 1277-1286 (1998)), the alkaline phosphatase promoter, a tryptophan (trp) promoter system (Goeddel, *Nucleic Acids Res.*, 8:4057 (1980) and EP 36,776), the $P_{LtetO-1}$ and $P_{lac/ara-1}$ promoters (Lutz and Bujard, *Nucleic Acids Res.*, 25:1203-1210 (1997)), and hybrid promoters such as the tac promoter. deBoer et al., *Proc. Natl. Acad. Sci.* USA, 80:21-25 (1983). However, other known bacterial inducible promoters and low-basal-expression promoters are suitable. Their nucleotide sequences have been published, thereby enabling a skilled worker operably to ligate them to DNA encoding the heterologous polypeptide of interest or to the nucleic acids encoding the lytic enzymes (Siebenlist et al., *Cell*, 20:269 (1980)) using linkers or adaptors to supply any required restriction sites. If a strong and highly leaky promoter, such as the trp promoter, is used, it is generally used only for expression of the nucleic acid encoding the heterologous polypeptide and not for lytic-enzyme-encoding nucleic acid. The tac and PL promoters could be used for either, but not both, the heterologous polypeptide and the lytic enzymes, but are not preferred. Preferred are the alkaline phosphatase promoter for the product and the arabinose promoter for the lytic enzymes.

Promoters for use in bacterial systems also generally contain a Shine-Dalgarno (S.D.) sequence operably linked to the DNA encoding the heterologous polypeptide of interest. The promoter can be removed from the bacterial source DNA by restriction enzyme digestion and inserted into the vector containing the desired DNA. The phoA promoter can be removed from the bacterial-source DNA by restriction enzyme digestion and inserted into the vector containing the desired DNA.

Construction of suitable vectors containing one or more of the above-listed components employs standard ligation techniques. Isolated plasmids or DNA fragments are cleaved, tailored, and re-ligated in the form desired to generate the plasmids required.

For analysis to confirm correct sequences in plasmids constructed, the ligation mixtures are used to transform *E. coli* K12 strain 294 (ATCC 31,446) or other strains, and successful transformants are selected by ampicillin or tetracycline resistance where appropriate. Plasmids from the transformants are prepared, analyzed by restriction endonuclease digestion, and/or sequenced by the method of Sanger et al., *Proc. Natl. Acad. Sci.* USA, 74:5463-5467 (1977) or Messing et al., *Nucleic Acids Res.*, 9:309 (1981), or by the method of Maxam et al., *Methods in Enzymology*, 65:499 (1980).

Suitable bacteria for this purpose include archaebacteria and eubacteria, especially eubacteria, more preferably Gram-negative bacteria, and most preferably Enterobacteriaceae. Examples of useful bacteria include *Escherichia, Enterobacter, Azotobacter, Erwinia, Bacillus, Pseudomonas, Klebsiella, Proteus, Salmonella, Serratia, Shigella, Rhizobia, Vitreoscilla,* and *Paracoccus*. Suitable *E. coli* hosts include *E. coli* W3110 (ATCC 27,325), *E. coli* 294 (ATCC 31,446), *E. coli* B, and *E. coli* X1776 (ATCC 31,537). These examples are illustrative rather than limiting. Mutant cells of any of the above-mentioned bacteria may also be employed. It is, of course, necessary to select the appropriate bacteria taking into consideration replicability of the replicon in the cells of a bacterium. For example, E. coli, Serratia, or Salmonella species can be suitably used as the host when well-known plasmids such as pBR322, pBR325, pACYC177, or pKN410 are used to supply the replicon.

E. coli strain W3110 is a preferred host because it is a common host strain for recombinant DNA product fermentations. Preferably, the host cell should secrete minimal amounts of proteolytic enzymes. For example, strain W3110 may be modified to effect a genetic mutation in the genes encoding proteins, with examples of such hosts including E. coli W3110 strain 1A2, which has the complete genotype tonA.DELTA. (also known as. DELTA.fhuA); E. coli W3110 strain 9E4, which has the complete genotype tonA.DELTA. ptr3; E. coli W3110 strain 27C7 (ATCC 55,244), which has the complete genotype tonA.DELTA. ptr3 phoA.DELTA.E15.DELTA. (argF-lac) 169 ompT-.DELTA. degP41kan.sup.r; E. coli W3110 strain 37D6, which has the complete genotype tonA.DELTA. ptr3 phoA.DELTA.E15.DELTA. (argF-lac) 169 ompT.DELTA. degP41kan.sup.r rbs7.DELTA. ilvG; E. coli W3110 strain 40B4, which is strain 37D6 with a non-kanamycin resistant degP deletion mutation; E. coli W3110 strain 33D3, which has the complete genotype tonA ptr3 laclq LacL8 ompT degP kan.sup.r; E. coli W3110 strain 36F8, which has the complete genotype tonA phoA.DELTA. (argF-lac) ptr3 degP kan.sup.R ilvG+, and is temperature resistant at 37. degree. C.; E. coli W3110 strain 45F8, which has the complete genotype fhuA (tonA).DELTA. (argF-lac) ptr3 degP41 (kanS).DELTA. omp. DELTA. (nmpc-fepE) ilvG+phoA+ phoS* (T10Y); E. coli W3110 strain 33B8, which has the complete genotype tonA phoA.DELTA. (argF-lac) 189 deoC degP IlvG+ (kanS); E. coli W3110 strain 43E7, which has the complete genotype fhuA (tonA).DELTA. (argF-lac) ptr3 degP41 (kanS).DELTA.opmT.DELTA. (nmpc-fepE) ilvG+ phoA+; and an E. coli strain having the mutant periplasmic protease(s) disclosed in U.S. Pat. No. 4,946,783 issued Aug. 7, 1990.

Host cells are transformed with the above-described expression vectors of this invention and cultured in conventional nutrient media modified as appropriate for inducing the various promoters if induction is carried out.

Transformation means introducing DNA into an organism so that the DNA is replicable, either as an extrachromosomal element or as chromosomal integration. Depending on the host cell used, transformation is done using standard techniques appropriate to such cells. The calcium treatment employing calcium chloride, as described in section 1.82 of Sambrook et al., Molecular Cloning: A Laboratory Manual (New York: Cold Spring Harbor Laboratory Press, 1989), is generally used for bacterial cells that contain substantial cell-wall barriers. Another method for transformation employs polyethylene glycol/DMSO, as described in Chung and Miller, Nucleic Acids Res., 16:3580 (1988). Yet another method is the use of the technique termed electroporation.

Bacterial cells used to produce the heterologous polypeptide of interest described in this invention are cultured in suitable media in which the promoters can be induced as described generally, e.g., in Sambrook et al., supra.

Any other necessary supplements besides carbon, nitrogen, and inorganic phosphate sources may also be included at appropriate concentrations, introduced alone or as a mixture with another supplement or medium such as a complex nitrogen source. The pH of the medium may be any pH from about 5-9, depending mainly on the host organism.

For induction, typically the cells are cultured until a certain optical density is achieved, e.g., a A.sub.550 of about 80-100, at which point induction is initiated (e.g., by addition of an inducer, by depletion of a repressor, suppressor, or medium component, etc.), to induce expression of the gene encoding the heterologous polypeptide. When about 50% or more of the heterologous polypeptide has accumulated (as determined, e.g., by the optical density reaching a target amount observed in the past to correlate with the desired heterologous polypeptide accumulation, e.g., a A.sub.550 of about 120-140), induction of the promoter is effected for the lysis enzymes. The induction typically takes place at a point in time post-inoculation about 75-90%, preferably about 80-90%, of the total fermentation process time, as determined from prior experience and assays. For example, induction of the promoter may take place at from about 30 hours, preferably 32 hours, up to about 36 hours post-inoculation of a 40-hour fermentation process.

Gene expression may be measured in a sample directly, for example, by conventional northern blotting to quantitate the transcription of mRNA (Thomas, Proc. Natl. Acad. Sci. USA, 77:5201-5205 (1980)). Various labels may be employed, most commonly radioisotopes, particularly .sup.32 P. However, other techniques may also be employed, such as using biotin-modified nucleotides for introduction into a polynucleotide. The biotin then serves as the site for binding to avidin or antibodies, which may be labeled with a wide variety of labels, such as radionuclides, fluorescers, enzymes, or the like.

Disclosed herein is a method of preparing paraxanthine (1,7-dimethylxanthine) and/or 7-methylxanthine, comprising: contacting a bacterial strain expressing a N-demethylase mutant reductase with caffeine, theobromine, or theophylline. In specific examples, the N-demethylase-mutant reductase is a mutated NdmA and/or NdmB. In other examples, the mutation is at F174, F223, L248, N282, V285, and F286 of NdmA. In other examples, the mutation is N282Q (NdmA1), F286L (NdmA2), NdmB Q289N (NdmB1), NdmB L293F (NdmB2), N282Q F286L (NdmA3). In other examples, the mutation is Q289N L293F (NdmB3) of NdmB. In other examples, the mutation is a loop swapped-double mutant (NdmA4) where the loop region between β13 and β14 of NdmA is swapped with the looped region of NdmB. In other examples, the strain also expresses frmAB. In other examples, the bacterial strain is E. coli. In other examples, the strain is one of E. coli MBM001 through E. coli MBM019. In other examples, the strain is contacted with caffeine. In other examples, the strain is contacted with theobromine. In other examples, the method comprises isolating paraxanthine (1,7-dimethylxanthine) and/or 7-methylxanthine.

EXAMPLES

To further illustrate the principles of the present disclosure, the following examples are put forth so as to provide those of ordinary skill in the art with a complete disclosure and description of how the compositions, articles, and methods claimed herein are made and evaluated. They are intended to be purely exemplary of the invention and are not intended to limit the scope of what the inventors regard as their disclosure. Efforts have been made to ensure accuracy with respect to numbers (e.g., amounts, temperatures, etc.); however, some errors and deviations should be accounted for. Unless indicated otherwise, temperature is ° C. or is at ambient temperature, and pressure is at or near atmospheric. There are numerous variations and combinations of process conditions that can be used to optimize product quality and performance. Only reasonable and routine experimentation will be required to optimize such process conditions.

Materials and Methods:

Chemicals

All enzymes (Taq, T4 DNA ligase, Phusion) with corresponding buffers were purchased from New England Biolabs (Ipswich, MA). Tryptone, agar, yeast extract, ferric chloride, potassium phosphate dibasic anhydrous, and potassium phosphate monobasic anhydrous were obtained from VWR International (Radnor, PA). Sodium chloride, glacial acetic acid, and HPLC grade methanol were supplied by VWR Chemicals BDH (Radnor, PA). All DNA purification kits were from Omega Bio-Tek (Norcross, GA). The Pfu enzyme was from Agilent (Santa Clara, CA). Caffeine was from J.T. Baker, Avantor (Randor, PA), theophylline was supplied by MP Biomedicals LLC (Irvine, CA), and theobromine was from ACROS organics (Morris Plains, NJ). Isopropyl-β-D-thiogalactopyranoside was purchased from Indofine Chemical company (Hillsborough, NJ). The PCR primers were bought from Eurofins Genomics (Louisville, KY), which also provided DNA sequencing service.

Plasmid Construction

Figure 26:
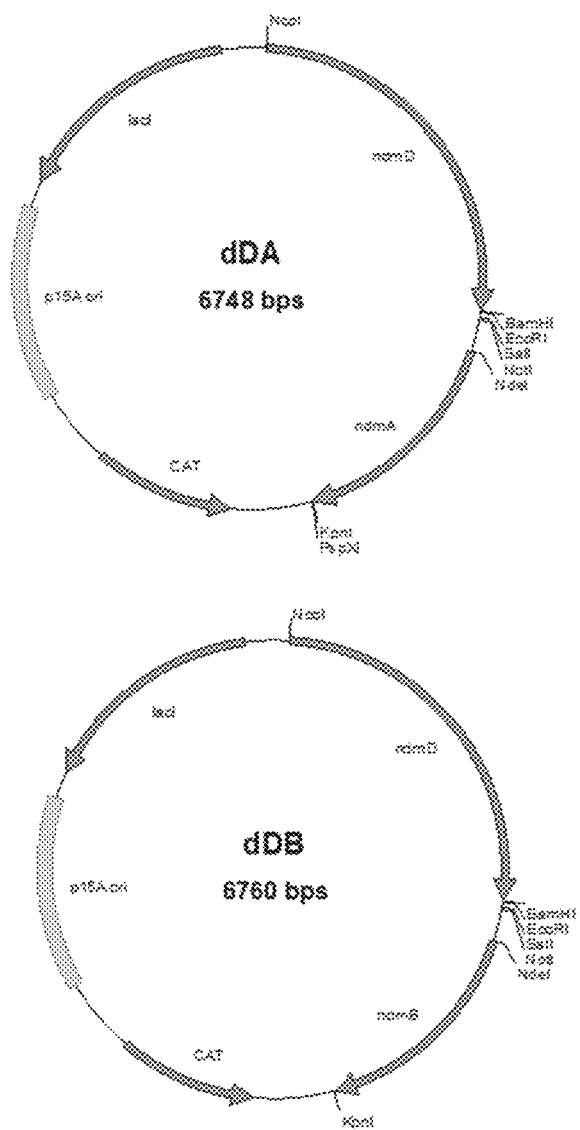
FIG. 26 shows plasmid maps of dDA and dDB, which served as the basis for all further plasmids created in the work.

All plasmids and primers used in this project are listed in FIGS. 29 and 24, respectively. The NdmA, NdmB, and NdmD mutants were generated by site-directed mutagenesis. The A-N282Q-F/R and A-F286L-F/R primer pairs were used with plasmid dDA (FIG. 26) to construct plasmids dDA1 and dDA2, respectively. Similarly, plasmids dDB1 and dDB2 were created using primer pairs B-Q289N-F/R and B-L293Q-F/R, respectively, from plasmid dDB (FIG. 26). Plasmid dA3 was generated using dDA2 as template with A3-N282A-F/R primers, and dDB2 was mutated to dDB3 using the B3-Q298N-F/R primer set. The V541R and V541W mutations on NdmD were created first using primer pairs D-V541W-F/R and D-V541R-F/R and pET28-His-ndmD (PD) as a template to create plasmids pDW and pDR, respectively. A single point mutation, C69A, was then created from these plasmids using primer pair D-C69A-F/R, resulting in plasmids pD1, pDW1, and pDR1. A second round of mutagenesis to introduce a C50A mutation was carried out with the primer pair D-C50A-F/R, generating plasmids pD2, pDW2 and pDR2. A loop-swapped NdmAQL mutant was amplified using primers Loop-F-NdeI and NdmA-R-KpnI and cloned into the pACYCDuet-1 plasmid already containing the ndmD gene, generating plasmid dDA4. Successful mutagenesis and cloning was confirmed by DNA sequencing. All plasmids were transformed into *E. coli* BL21 (DE3) for protein production using a modified heat shock method based on Chung et al. (Chung et al. 1989). A full list of strains used in this project is given in FIG. 25.

Cell Growth and Assays

Induction of gene expression and resting cell assays were carried out as described previously. Cells containing the plasmids of interest were grown in LB broth with appropriate antibiotics at 37° C. with 200 rpm shaking. When the $OD_{600}$ reached 0.5, $FeCl_3$ was added to a final concentration of 10 µM, and the cultures were moved to 18° C. with 200 rpm shaking. At an $OD_{600}$ of 0.8-1.0, IPTG was added to a final concentration of 0.1 mM, and the cultures were grown overnight at 18° C. for 16-20 h. Cells were harvested by centrifugation at 10,000×g for 10 minutes at 4° C. and resuspended in 50 mM potassium phosphate (KPi) buffer (pH 7.5).

Resting cell assays were carried out in a 2 mL total volume reaction containing 1 mM methylxanthine and freshly-harvested whole cells ($OD_{600}$=5.0) in KPi buffer. Reactions were incubated at 30° C. with 200 rpm agitation. A sample from each reaction was taken at various time points and combined with an equal amount of acetonitrile or methanol to stop the reaction from proceeding. All samples were performed in triplicate.

Analytical Procedures

Samples from resting cell assays were analyzed with a Shimadzu LC-20AT high performance liquid chromatography (HPLC) equipped with an SPD-M30A photodiode array detector to identify metabolic products and quantify the methylxanthines as described previously. Compounds were separated on a Hypersil BDS C18 column (100 mm×4.6 mm) with a mobile phase of methanol/water/acetic acid (15:85:0.5/v/v).

Example 1

In a first example, recent crystal structures of NdmA and NdmB revealed two domains: a Rieske domain at the N-terminus containing 3 α-helices and 9 β-strands and a C-terminal ligand binding domain with 5 α-helices and 8 β-strands. Additionally, both possess a loop region between β-13 and β-14 that is highly flexible and changes conformation depending upon the substrate binding. Within the binding pocket of NdmA, F168 established a x-x bond with the purine backbone of the caffeine molecule, with additional hydrophobic interactions between caffeine and side chain atoms of F174, F223, L248, N282, V285, and F286. These residues allow alignment of caffeine in the binding pocket to enable removal of the $N_1$-methyl group. Interestingly, the sequence alignment indicated that all but two of the same residues were present in the NdmB binding pocket, which is responsible for $N_3$-demethylation of theobromine; the N282 and F286 in NdmA are Q289 and L293 in NdmB. Indeed, an NdmA N282Q F286L double mutant (previously named NdmAQL, but hereafter termed NdmA3) demonstrated increased activity toward the $N_3$-methyl group of caffeine in purified enzyme studies. As enzyme activity can vary greatly when assayed in vivo compared with in vitro reactions, it was desired to determine the activity of mutated NdmA and NdmB enzymes in whole cells.

Single mutants of NdmA N282Q (NdmA1), F286L (NdmA2), NdmB Q289N (NdmB1), NdmB L293F (NdmB2), and double mutants NdmA3 and NdmB Q289N L293F (NdmB3) were constructed through site-directed mutagenesis. Each gene was placed in the pACYCDuet-1 plasmid containing the ndmD gene in a separate multiple cloning site. The NdmD enzyme is a unique Rieske reductase that is absolutely essential for N-demethylation activity, passing electrons from NADH to NdmA or NdmB. Each N-demethylase mutant-reductase combination was expressed in *E. coli* BL21 (DE3), and activity of whole cells toward caffeine, theobromine, and theophylline was determined through resting cell assays.

Example 2

Figures 2A, 2B, 2C, 2D, 2E, 2F:
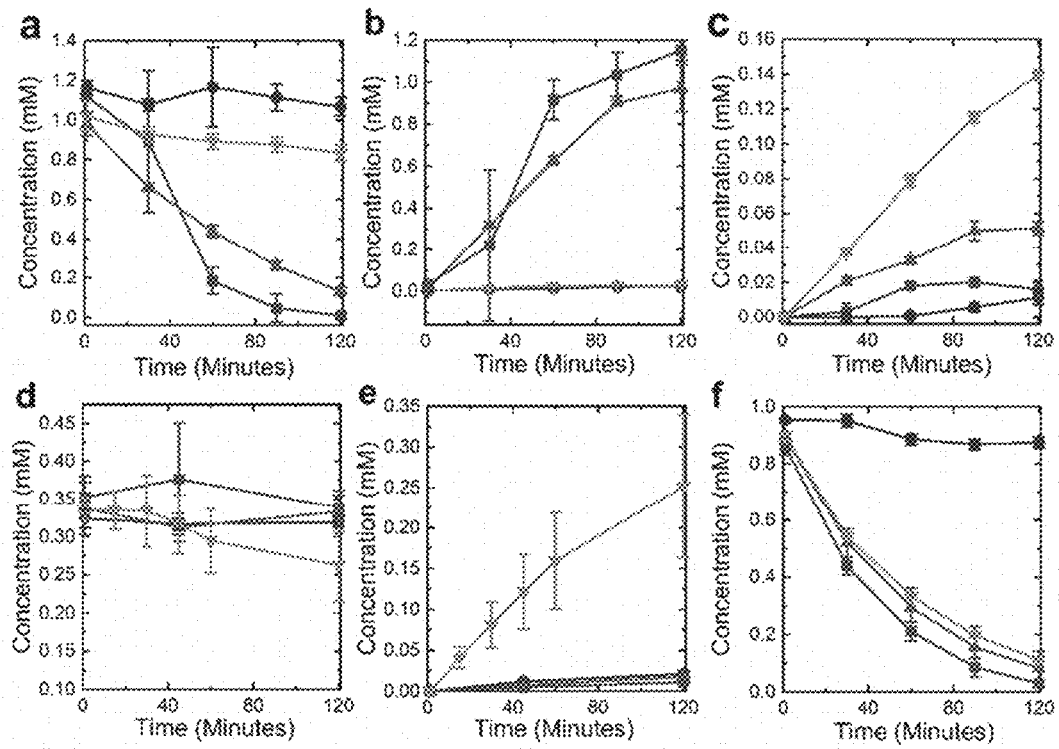
FIGS. 2A-2F show the conversion of caffeine (FIG. 2A) to theobromine (FIG. 2B) and paraxanthine (FIG. 2C), and theobromine (FIG. 2D) to 7-methylxanthine (FIG. 2E).

In a second example, each NdmA mutation decreased the activity of the enzyme toward caffeine (FIG. 2A, FIG. 6). The F286L single mutation had the lowest effect on enzyme activity, with reduction in caffeine consumption rate about 1.5-fold in cells expressing ndmA2 compared with the controls expressing the wild-type ndmA. The largest change in activity was due to the N282Q mutation, which reduced activity in cells with NdmA1 by over 15-fold. Surprisingly, the NdmA3 double mutant improved cell activity over that of NdmA1 by 2.7-fold, with only a 7.2-fold reduction in activity from the wild-type NdmA. This reduction in activity is considerably less than the 18-fold reduction in activity observed by the double mutant in purified enzyme assays.

A closer look at the metabolites produced from caffeine (FIGS. 2B & C) demonstrates that the N282 residue is key in aligning caffeine in the NdmA binding pocket for $N_1$-demethylation. The N282Q mutation increased the amount of paraxanthine in the products from caffeine from 1.4% by the wild-type NdmA to 28.9% by NdmA1, whereas the single F286L mutant NdmA2 only produced 5.1% paraxanthine (FIG. 6). Furthermore, the double mutant displayed high synergy in shifting activity from the $N_1$- to the $N_3$-methyl group, resulting in 82.9% paraxanthine produced from the caffeine consumed. When theobromine was used as substrate to test activity toward the $N_3$-methyl group, cells containing NdmA, NdmA1, and NdmA2 showed no significant decrease in theobromine concentration (FIG. 2D). However, cells with NdmA3 exhibited slight $N_3$-demethylase activity toward theobromine, consuming 74.0±32.7 µM theobromine over two hours (FIGS. 2D & E). Thus, the N282Q and F286L mutations enable the NdmA3 binding pocket to mimic that of NdmB, although at lower positional specificity and kinetic rate.

Replacing caffeine with theophylline in the resting cell assay further confirmed the above results. The N282Q mutation (NdmA1) resulted in 88.1% of the marginal theophylline consumed being converted to 1-methylxanthine instead of 3-methylxanthine (FIG. 2F, FIG. 6). The addition of the second mutation, F286L (NdmA3) further increased the amount of 1-methylxanthine as product to 98.6% and increased the enzymatic activity when compared to NdmA1 (FIG. 6). Strain dDA3 expressing the double mutant reacted 4.5 times faster towards theophylline than caffeine, indicating that theophylline may fit better in the NdmA3 binding pocket due to the lack of an $N_7$-methyl group.

Example 3

Figures 3A, 3B, 3C, 3D:
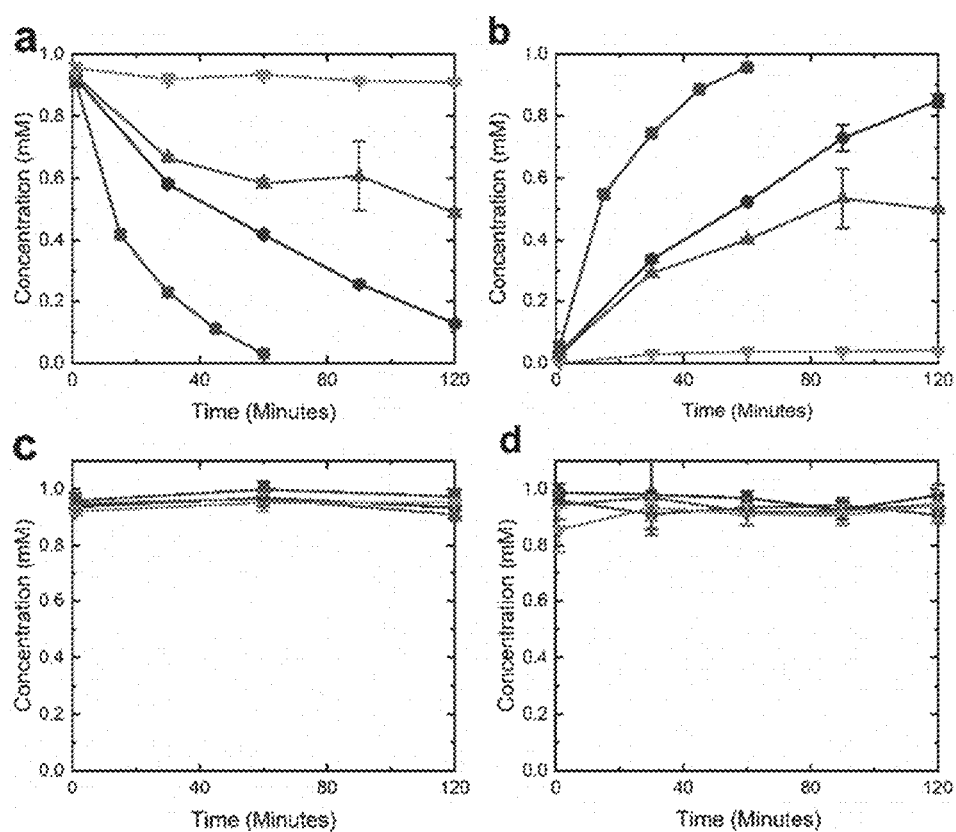
FIGS. 3A-3D show the conversion of theobromine (FIG. 3A) to 7-methylxanthine (FIG. 3B) at differing rates. No significant activity was observed toward caffeine (FIG. 3C) or theophylline (FIG. 3D). ■, NdmB; ●, NdmB1; ▲, NdmB2; ▼, NdmB3. Concentrations reported are means with standard deviations of triplicate results.

Characterization of the NdmB mutants began with theobromine, as it is the preferred substrate for this enzyme. The control strain expressing ndmB with ndmD consumed 974.2±19.4 µM theobromine within 90 minutes (FIG. 3A). Single mutations resulted in decreased activities toward theobromine (FIG. 3A); NdmB1 and NdmB2 cells consumed 793.4±23.1 and 439.8±7.0 µM theobromine over two hours. Initial rates of cells containing NdmB1 and NdmB2 toward theobromine were reduced approximately 10-20%, although NdmB1 cells consumed nearly twice as much theobromine as NdmB2 cells over two hours (FIG. 3A). Thus, the Q289N mutation on NdmB had a much lower effect on activity than did the N282Q mutation on NdmA, while the effect of the L293F mutation to NdmB was much greater than that of the F286L mutation on NdmA. Cells containing the NdmB3 double mutant exhibit minimal activity toward theobromine, with production of only 40.4±1.3 µM 7-methylxanthine over two hours (FIGS. 3A & B). This lack of activity toward theobromine by NdmB3 indicated that the binding pocket may be more suitable for $N_1$-demethylation, as hypothesized.

In order to determine whether specificity of NdmB3 was swapped from the $N_3$- to the $N_1$-methyl group, activity of the enzyme toward caffeine and theophylline was tested, which both contain $N_1$-methyl groups. There was no detection of a significant change in caffeine (FIG. 3C) or theophylline (FIG. 3D) concentrations after two hours of incubation with the whole cell biocatalysts. Similarly, consumption of caffeine and theophylline by the single mutants was greatly limited. SDS-PAGE analysis of the cells indicated that NdmB3 was produced at similar levels as the other mutants, thus insolubility of the enzyme is not likely the main reason for lack of activity toward caffeine or theophylline. The wild-type NdmB does not readily $N_3$-demethylate caffeine or theophylline in vitro, and the same holds true for the resting cell assays. This further suggests that presence the $N_1$-methyl group inhibits activity of NdmB, most likely through steric hindrances near the active site. Thus, NdmB and the mutants described here are not suitable to perform $N_1$-demethylation reactions.

Example 4

Further analysis of the NdmA crystal structure revealed that a loop region between B13 and B14 changed conformation in the presence of caffeine, and that swapping this loop on the double mutant with the analogous NdmB loop resulted in increased $N_3$-demethylase activity, albeit at lower protein solubility. The same expression vector described earlier in this study was used to express the loop-swapped double mutant (hereafter termed NdmA4) in *E. coli* BL21 (DE3) cells for direct comparison with the other mutants. Activity of cells containing NdmA4 was similar to those of cells with NdmA3 when caffeine was used as substrate (FIGS. 4A & B), although molar yield of paraxanthine was higher with NdmA4 (FIG. 7). A slight production of 7-methylxanthine, generated by $N_1$-demethylation of paraxanthine was also observed (data not shown).

Figures 4A, 4B, 4C:
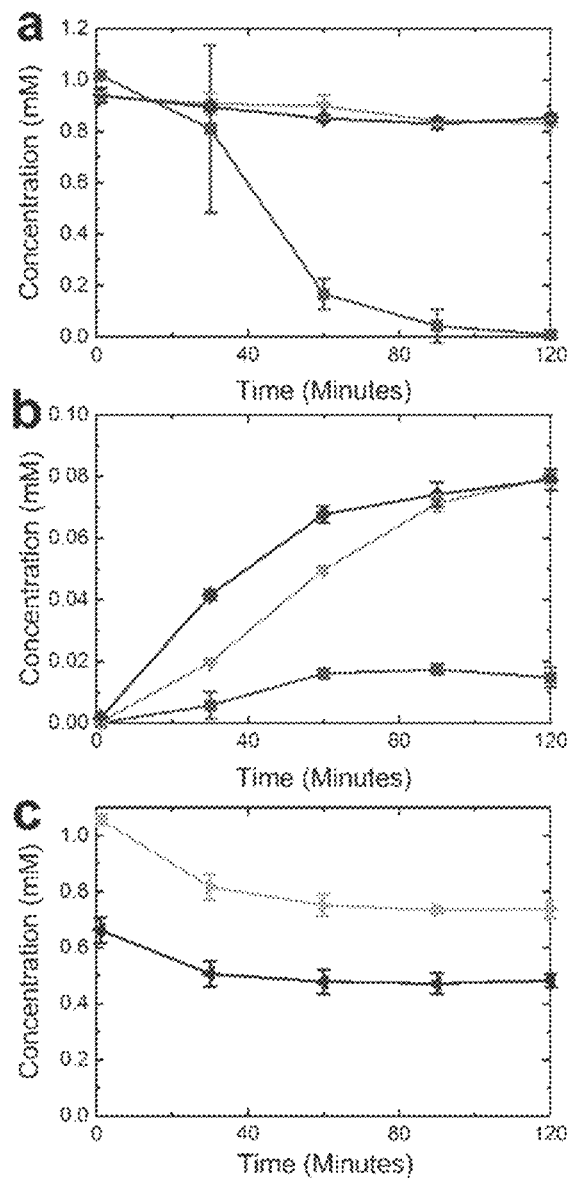
FIGS. 4A-4C show the conversion of caffeine (FIG. 4A) to paraxanthine (FIG. 4B) over the course of two hours by cells containing NdmA (■) NdmA3 (▼), and NdmA4 (♦).

Cells containing NdmA4 had decreased activity and conversion of theophylline compared to cells with NdmA3. Over the same two hour period only 30% of the theophylline was consumed by cells with NdmA4 (FIG. 4C) in contrast to the 87% of theophylline consumption achieved by cells expressing NdmA3 (FIG. 2F). Increased $N_3$-demethylase activity with NdmA4 cells was more readily detected when theobromine was used as substrate (FIG. 4C). Cells containing NdmA4 consumed 180±32 µM theobromine in 120 min, compared with 74±33 µM theobromine consumed by cells with NdmA3 (FIG. 2D) over the same time period. This further confirms the mutations on NdmA to mimic the environment of the NdmB binding pocket were successful, and this protein engineering approach switched the selectivity from the $N_1$-methyl group to the $N_3$-methyl group of caffeine and related methylxanthines.

Example 5

Initial reports using purified enzymes suggested that mutating the V541 residue of NdmD could interrupt the electron transfer from the reductase to the N-demethylase; a V541W mutation (NdmDW) reduced N-demethylation activity of NdmA to below 20% that of the wild type while a V541R mutation (NdmDR) resulted in almost no activity. The differences in N-demethylase activity between in vitro and in vivo conditions demonstrated in this study led to the investigation of whether the reductase mutants would also act differently in the whole-cell system. Thus, NdmD mutants were constructed to explore the potential tunability of these enzymes.

Figures 5A, 5B, 5C, 5D:
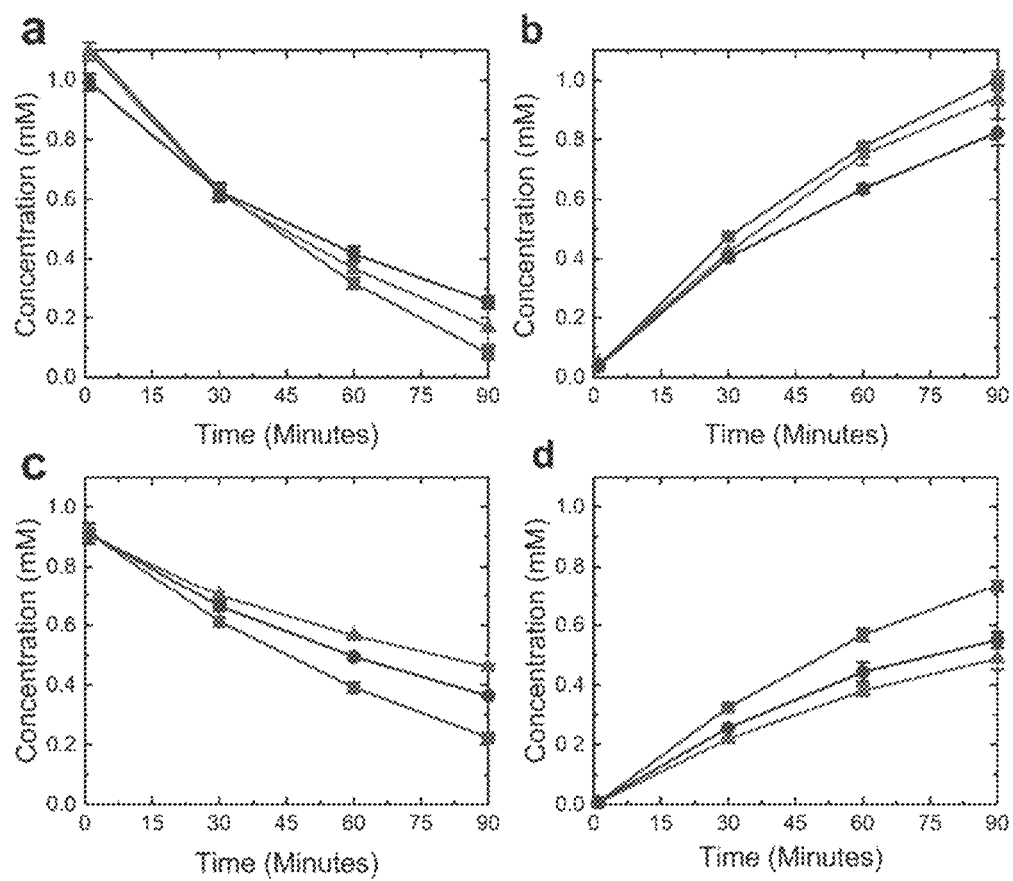
FIGS. 5A-5D show the conversion of caffeine (FIG. 5A) by NdmA to theobromine (FIG. 5B), and theobromine (FIG. 5C) is converted by NdmB to 7-methylxanthine (FIG. 5D). ■, NdmD; ▲, NdmDW; ●, NdmDR. Cells ($OD_{600}$=5.0) were incubated with 1 mM caffeine or theobromine in 50 mM KP; buffer at 30° C. with 200 rpm shaking, and metabolites were quantified by HPLC. Concentrations reported are means with standard deviations of triplicate results.

Cells harboring wild-type NdmA or NdmB with either of the two reductase mutants showed a slight decrease in activity, although not nearly as drastic as that observed from purified proteins (FIG. 5). The $N_1$-demethylase activity in NdmA cells containing NdmDW and NdmDR was about 7% and 30% lower, respectively, than in cells with the wild type reductase. Conversely, $N_3$-demethylase activity in NdmB cells was reduced by 36% and 20%, respectively, by cells with the NdmDW and NdmDR mutants. Thus, while these mutations do appear to interfere with the interaction between NdmD and either NdmA or NdmB, based on reduction of N-demethylase activity, the remaining activity is still more than 60% of the wild-type enzyme in the in vivo assays, demonstrating remarkable improvement in activity when compared with in vitro reactions.

The NdmD reductase contains an extra Rieske [2Fe-2S] cluster at its N-terminal end when compared with other Rieske reductases, but the cluster is not necessary for activity of NdmA. Thus, the Rieske cluster was also removed from the full-length NdmD by site-directed mutagenesis and assessed the effect of the mutations on N-demethylase activity of the whole-cell biocatalysts. Because the C50 and C69 residues of NdmD coordinate the Rieske [2Fe-2S] cluster, the residues were mutated to alanine so that the protein could not bind the cluster. First, a C69A single mutation was carried out on NdmD, NdmDW and NdmDR, resulting in NdmD1, NdmDW1, and NdmDR1, respectively. These single mutants were further altered to include a C69A mutation creating NdmD2, NdmDW2, and NdmDR2 double mutants.

Figures 6A, 6B, 6C:
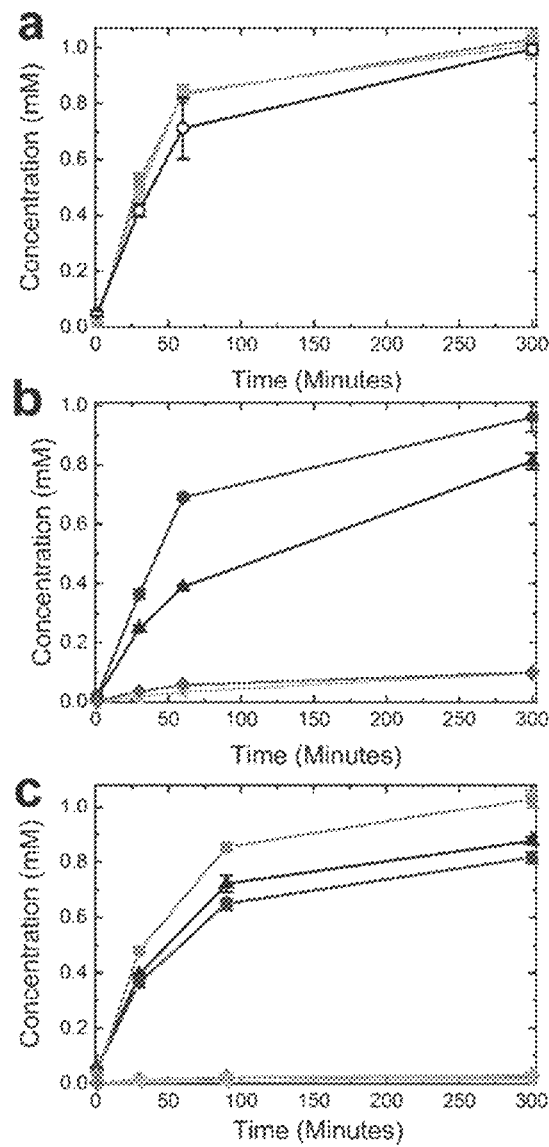
FIGS. 6A-6C show the (FIGS. 6A and 6B) production of theobromine by cells containing NdmA, (FIG. 6C) production of 7-methylxnthine by cells containing NdmB. o, NdmD; ■, NdmD1; ●, NdmD2; ▲, NdmDW1; ◀, NdmDW2; ●, NdmDR1; and ♦, NdmDR2. Disappearance of substrate is shown in FIG. 10. Concentrations reported are means with standard deviations of triplicate results.

Interestingly, a wide range of activities for the various reductase mutants was observed when they were assayed in the whole-cell biocatalyst system (FIGS. 6 and 24). There was no significant change in $N_1$-demethylase activity of cells containing NdmA when NdmD was swapped for NdmD1 or NdmD2 (FIG. 6A). This was as expected, given previous reports of a truncated reductase with similar activity. However, the single C69A and double C50A C69A mutations had a great effect on activity of the NdmDW and NdmDR mutants (FIG. 6B). The rate of $N_1$-demethylation was reduced by 18% with NdmDR1 and 58% by NdmDW1, when compared with NdmD1. The double mutation had a much greater effect on activity, as activity was reduced by 89% and 98% by NdmDR2 and NdmDW2, respectively, when compared with NdmD2.

For cells with NdmB, a range in $N_3$-demethylation activity from the various mutant reductases assayed was observed (FIG. 6C). Compared with NdmD1, the activity of strains with NdmDR1 and NdmDW1 was reduced 33% and 27%, respectively. The activity of NdmD2, NdmDR2, and NdmDW2 mutants toward theobromine was almost negligible, with production of only 26.4±2.0, 14.2±0.4, and 30.8±0.6 µM 7-methylxanthine after 5 hours.

Materials and Methods:

Chemicals and Reagents

Caffeine was purchased from J.T. Baker (Phillipsberg, NJ, USA). Paraxanthine was procured from Sigma-Aldrich (St. Louis, MO, USA). 7-methylxanthine was acquired from Alfa Aesar (Haverhill, MA, USA). Luria-Bertani media was made according to the protocol described by MacWilliams, et. al. Isopropyl β-D-thiogalactopyranoside (IPTG) was bought from INDOFINE Chemical Company (Hillsborough, NJ, USA). PCR reactions were performed using Phusion HF polymerase. All restriction enzymes and PCR reagents were purchased from New England BioLabs (Ipswich, MA, USA). Antibiotics were obtained from AMRESCO (Solon, OH, USA). Methanol used during chromatograph separations was of HPLC-grade from J.T. Baker (Phillipsburg, NJ, USA).

Plasmid Construction

All plasmids used in this study are listed in FIG. 28, and a list of all primers used can be found in FIG. 27. All genes were amplified using Phusion HF Polymerase. Based on literature, the copy number of the pET-28a (+), pETDuet-1 and pET-32a (+) vector backbones was assumed to be approximately 40, while that of the pACYCDuet-1 vector backbone was assumed to be approximately 10. All plasmids were constructed such that the genes are under the control of the strong T7 promoter, allowing for selective induction of expression via IPTG. When more than one gene was incorporated into the pET-28a (+) vector, a synthetic ribosomal binding site was designed and included between the two genes. Construction of plasmids pD, dDD, dAO, dA and dAA have been previously described.

Plasmid pDP1 was constructed by first amplifying the NdmDP1 fragment, a truncated NdmD, using primers NdmDP1-GA-F/NdmDP1-GA-R and inserting the fragment via Gibson Assembly into a pET28a (+) backbone that had been digested using the restriction enzymes NdeI and BamHI. Plasmid pDrbs1A4 was constructed in a similar manner as pDP1; however, NdmD and NdmA4 were first amplified using the primers NdmD1-F/NdmD1-R and Loop2-F/Loop2-R, respectively. The two fragments were then inserted into the digested backbone via Gibson Assembly, combining them into one fragment connected by a ribosomal binding site (rbs1), 5'-TCTAGAGAAAGAG-GAGAAATACTAG-3' (SEQ ID. No. 65), that had been built into the primers. Plasmids pDrbs2A4 and pDP 1rbs2A4 were constructed in the same manner using primers NdmD-GA-F/NdmD-rbs-R and rbs-Loop-F/Loop-GA-R, and NdmDP1-GA-F/NdmD-rbs-R and rbs-Loop-F/Loop-GA-R, respectively. These fragments were linked by a second synthetic ribosomal binding site (rbs2), 5'-CGCGCAAGTCGTTACCAGGAAATTCTAT-3' (SEQ ID. No. 66).

In general, genes inserted into the first multiple cloning site (MCS1) of pACYCDuet-1 were amplified by forward primers containing an NcoI site and reverse primers containing a BamHI site. These fragments, along with the pACYCDuet-1 backbone, were then digested with NcoI and BamHI and ligated together. In a like manner, the second multiple cloning site (MCS2) required the use of NdeI and KpnI as the unique restriction sites. Specifically, plasmid dDA4 was constructed by first digesting dDD with NdeI and KpnI followed by the ligation of NdmA4 into MCS2 using primers Loop-F-NdeI/NdmA-R-KpnI and digesting the fragment with the corresponding restriction enzymes. Plasmid dA4A4 was constructed by first digesting the pACYC-Duet-1 with NcoI and BamHI and amplifying NdmA4 using the primers Loop-F-NcoI/NdmA-R-BamHI. The fragment was digested with the corresponding restriction enzymes and ligated into the backbone in MCS1. This process was repeated using NdeI and KpnI, the primers Loop-F-NdeI/NdmA-R-KpnI and MCS2. For genes spanning both multiple cloning sites (MCSs), a forward primer containing an NcoI site and a reverse primer containing a KpnI site were used the amplify the fragments, followed by digestion of the fragment and the backbone, and ligation. Plasmid dA4 was constructed to span both MCSs using the primer pair Loop-F-NcoI/NdmA-R-KpnI.

To construct the dAfrmAB and dA4frmAB plasmids, dAO and dA4A4 plasmids were digested with NdeI and KpnI to linearize the pACYCDuet-1 vector without affecting MCS1. The formaldehyde degrading genes (frmA and frmB) were then amplified from E. coli BL21 (DE3) genomic DNA using the primers frmA-Fl/frmA-rbs-R1 (frmA) and rbsfrmB-F1/frmB-R1 (frmB). The two fragments were then linked together during a Gibson Assembly by a ribosomal binding site designed into the primers, generating a single fragment (FrmAB). This FrmAB fragment was incorporated into MCS2 of the linearized pACYCDuet-1 vector during the Gibson Assembly.

Strain Construction

E. coli BL21 (DE3) was used as the parent strain to construct all of the strains used in this research. A complete list of strains with their descriptions is located in FIG. 9. Plasmids were transformed into chemically competent E. coli BL21 (DE3) and recombinant strains were plated on LB agar plates containing appropriate antibiotics at the following concentrations: 100 µg/mL ampicillin, 34 µg/mL chloramphenicol, and 30 µg/mL kanamycin. If two plasmids needed to be incorporated into one strain, one plasmid type was transformed into E. coli BL12 (DE3) and used to generate chemically competent cells for transformation of the second plasmid.

Cell Growth and Protein Expression

For initial strain comparison, all E. coli strains were grown and protein expressed as described by Mock, et. al. Briefly, cells were grown in LB with appropriate antibiotics at 37° C. and shaking at 200 rpm. When the $OD_{600}$ of the cells reached ~0.5, sterile iron chloride was added to a final concentration of 10 µM and the culture was shifted to 18° C. IPTG was added to a final concentration of 0.1 mM to induce gene expression when the $OD_{600}$ reached 0.8, and the cells were grown 14-16 hours post-induction at 18° C. with 200 rpm shaking. Cells were harvested by centrifugation at 10,000×g for 10 min at 4° C., then resuspended in ice cold 50 mM potassium phosphate (KPi) buffer (pH 7.5). Small scale cultures were carried out in 50 mL media. Cultures designated for product isolation were grown in four 2.8-L Fernbach flasks, each containing 1 L of media.

Reaction Conditions for Paraxanthine Production

Unless otherwise indicated, resting cell assays were conducted in test tubes at a volume of 2 mL, cells at an $OD_{600}$ of 5, and a caffeine concentration of 1 mM in KPi buffer. Reactions were carried out at 30° C. and 200 rpm shaking for 5 hours, and approximately 100 µL samples were taken periodically and analyzed via HPLC to determine methylxanthine concentrations using the appropriate standards.

The large-scale reaction for production and purification of paraxanthine used a maximized volume of 620 mL based on harvested cell density, with an $OD_{600}$ of 50 and a caffeine concentration of 5 mM. The reaction was incubated in a Fernbach flask at 30° C. and 200 rpm shaking for 5 hours. At the end of the reaction, the cells were harvested by centrifugation at 10,000×g for 10 min at 4° C. to separate them from the product, and the supernatant was collected for purification.

Preparatory HPLC

Prior to HPLC purification, the harvested supernatant was filtered through a 0.2 µm filter, and the final volume of supernatant collected measured 600 mL. About 48 mL of MeOH was added to the supernatant to prevent a swing in MeOH concentration from affecting the HPLC chromatograph. Paraxanthine purification was conducted using a ThermoScientific Hypersil BDS C18 preparatory HPLC column (20 mm diameter×150 mm length). The column was connected to a Shimadzu LC-20AT HPLC system equipped with a photodiode array detector to detect and record the UV-visible absorption spectra. A mobile phase of 7.5:92.5:0.5 (vol/vol/vol) methanol-water-acetic acid at a flow rate of 2.5 mL/min. An isocratic program was developed using two pumps operating at 2.5 mL/min so that one pump would load the post reaction mixture for 20 minutes (50 mL total) and the second pump would deliver the mobile phase. After 12 rounds of separation, 745 mL volume of paraxanthine solution was collected. The solution was concentrated using a rotary evaporator at 70° C. and 200-220 mbar, reducing the volume to 196 mL. The concentrated solution was finally dried at 140° C. for 9 hrs to produce paraxanthine powder.

Analytical Procedures

Paraxanthine was identified and quantified using the same HPLC system previously described. A ThermoScientific Hypersil BDS C18 HPLC column (4.6 mm inner diameter×150 mm length) was used as the stationary phase. A mobile phase of 15:85:0.5 (vol/vol/vol) methanol-water-acetic acid at a flow rate of 0.5 mL/min. Purity of the paraxanthine was confirmed using HPLC and NMR. The NMR results were obtained from the NMR facility in the Chemistry Department of the University of Alabama. The spectrum was recorded in DMSO-$d_6$ with a Bruker DRX 500 NMR spectrometer at 299 K. The chemical shifts were relative to DMSO-$d_6$ using the standard & notation in parts per million.

Example 6

Figure 10:
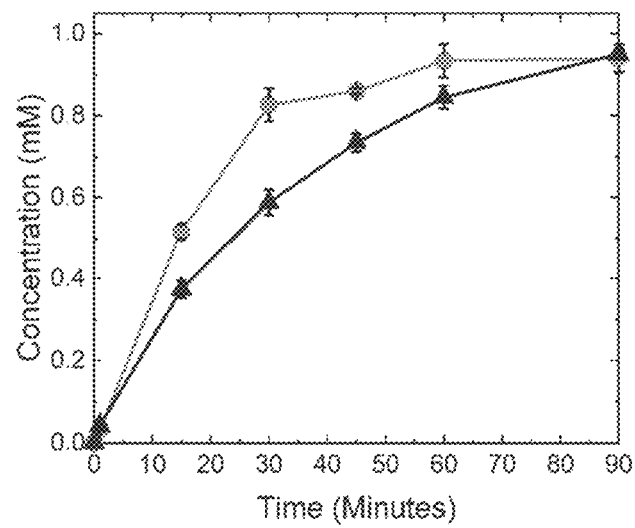
FIG. 10 shows theobromine production from caffeine by resting cells of strains pDdA0 (▲) and MBM015 (●).

To begin optimization of paraxanthine production, a screened twenty-one strains of metabolically engineered E. coli (FIGS. 9, 10 & 11) was constructed to study the effect of gene dosage, ribosomal binding sites, and NADH recycling on their ability to produce paraxanthine from caffeine. The initial screening was carried out in 2 mL reactions at 30° C. with an initial caffeine concentration of 1 mM and cells at an $OD_{600}$ of 5.0. A summary of caffeine consumed and paraxanthine produced by each strain is provided in FIG. 11.

Example 7

Algharrawi et al. previously showed that varying ndm gene copy could improve $N_1$-demethylation for 3-methylxanthine production from theophylline. A similar trend was observed with caffeine; caffeine was consumed and theobromine was produced faster using strain pDdAA than with strain pDdA (FIG. 23). Thus, the ability of cells with different copy numbers of ndmA4 and ndmD was evaluated to produce paraxanthine from caffeine (FIG. 12A, FIG. 13). NdmA4 is a mutant of NdmA that produces both paraxanthine (major product) and theobromine (minor product) from caffeine.

The initial strain, MBM002, contained one copy of ndmA4 and one copy of ndmD in the pACYCDuet-1 vector. This strain consumed 169±38 µM caffeine and produced 92±4 uM paraxanthine over four hours. Previous work demonstrated that increasing the amount of reductase could increase overall activity of the cells, thus the ndmD gene was moved to the pET28a (+) vector, which has a copy number approximately four times higher than the pACYC-Duet-1 vector. The resulting strain, MBM003, produced slightly more paraxanthine than MBM002 (FIG. 12A, FIG. 13), indicating that the activity may be limited by the amount of active NdmA4 in the cells. Therefore, the gene dosage of ndmA4 was doubled by expressing two copies from the pACYCDuet-1 vector in MBM004 and observed a marked increase in paraxanthine production, with 141±9 UM paraxanthine produced from 256±47 µM caffeine. When ndmA4 dosage increased further while lowering ndmD in MBM005, paraxanthine production decreased to 73±4 µM over five hours, indicating that increased NdmD levels were still needed.

The NdmD reductase has an extra Rieske [2Fe-2S] cluster that is not necessary for activity of NdmA, which led to the testing of a truncated ndmD gene, ndmDP1. The ndmD gene in strains MBM003 and MBM004 were swapped out for the ndmDP1 gene, creating strains MBM006 and MBM007. In both strains, the initial rate of paraxanthine production was lower than in their respective ndmD strain, but both strains produced a higher concentration of paraxanthine over five hours, with MBM007 producing a final concentration 172±5 µM paraxanthine. Additionally, the increasing trend for MBM007 appears to continue past 300 minutes, suggesting that a greater production of paraxanthine may be possible over longer times.

After observing the increase in activity from MBM003 to MBM004 by adding an extra copy of ndmA4 in the Duet vector, an additional copy of ndmA4 was added downstream of the reductase gene on the pET28a (+) vector. The genes were expressed as a bicistronic fragment linked by one of two ribosomal binding sites, rbs1 and rbs2, designed using the De Novo DNA: RBS calculator. Strain MBM008, which contained only the pET28a (+) vector with ndmD and ndmA4 linked by rbs1, produced 23±1 µM paraxanthine over 5 hours (FIG. 2B). By swapping out rbs1 with rbs2, a total of 48±1 µM paraxanthine was observed in the same time period using strain MBM009. Intriguingly, addition of the dA4A4 plasmid to MBM008 to create strain MBM010 greatly reduced the activity of the cells, which produced only 7±1 µM paraxanthine. In contrast, using rbs2 to give strain MBM011 resulted in production of 120±2 µM paraxanthine from 187±7 µM caffeine. The production of paraxanthine was further improved by replacing the ndmD gene with the truncated ndmDP1 to construct strain MBM014, which produced 178±7 µM paraxanthine over five hours.

Example 8

Figure 14:
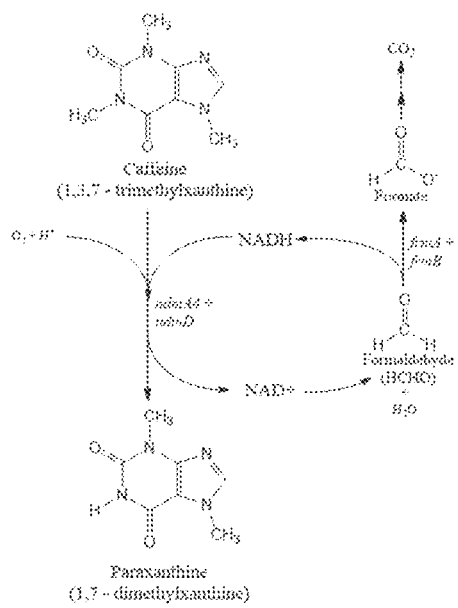
FIG. 14 shows the theoretical depiction of the NADH recycle pathway for the N-demethylation of caffeine to paraxanthine and concomitant conversion of formaldehyde to formate.
Figure 15:
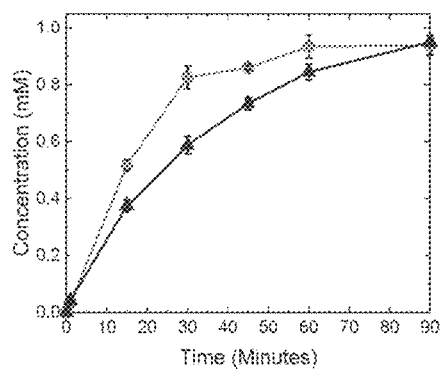
FIG. 15 shows theobromine production from caffeine by resting cells of strains pDdA0 (▲) and MBM015 (●).

During the N-demethylation process, one molecule of NADH is oxidized to NAD$^+$ and one molecule of formaldehyde is produced per methyl group removed. Because of the low rate of reaction and overall conversion previously observed, it was theorized that NADH availability may be a potential limitation to the conversion of caffeine to paraxanthine. NADH regeneration has been explored in other microbial systems with the purpose of increasing NADH availability and investigating the impact on cell metabolism with some success in improving the metabolic flux. With this concept in mind an NADH recycle system (FIG. 14) was designed using the frmAB formaldehyde dehydrogenase genes native to E. coli. These genes are part of a detoxification stress response system used by E. coli to protect the cell from the cytotoxicity of formaldehyde. During conversion of formaldehyde to formate, one molecule of NAD$^+$ is reduced to NADH. This enables the potential for the circulation of NADH to NAD$^+$ and back to NADH, removing NADH as a limiting factor in the demethylation of caffeine to paraxanthine.

Figures 11A, 11B, 11C:
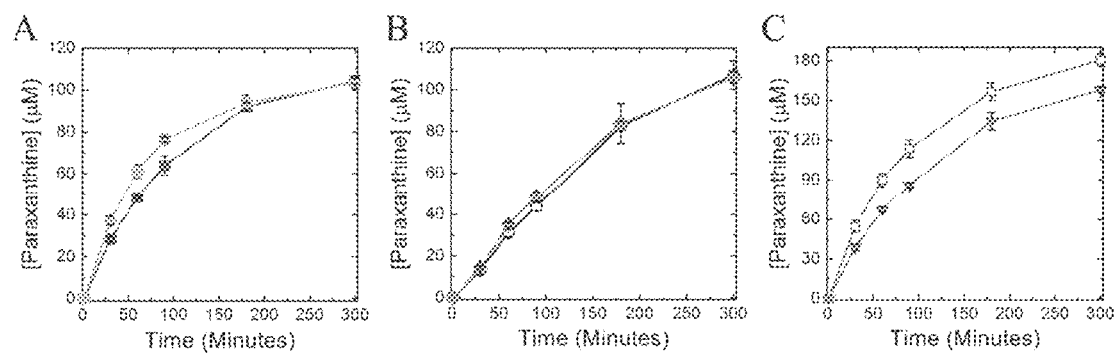
FIGS. 11A-11C show production of paraxanthine from caffeine by metabolically engineered E. coli. Comparison of strains (FIG. 11A) MBM003 (■) and MBM016 (●), (FIG. 11B) MBM006 (♦) and MBM018 (O), and (FIG. 11C) MBM013 (▼) and MBM019 (□). Concentrations reported are means with standard deviations of triplicate results.

To test the effectiveness of this NADH recycle system, strain MBM015 was constructed from pDdA0, which was previously established to convert 100% of caffeine to theobromine within two hours, by placing the frmAB genes under control of the T7 promoter in the empty cloning site of dAO. Resting cells of MBM015 produced theobromine from caffeine faster than did pDdA0 (FIG. 10), suggesting that expression of frmAB could improve reaction rates by improving NADH recycle. Therefore, four strains containing both frmAB and ndmA4 genes were constructed to test their ability to produce paraxanthine. Addition of frmAB to MBM003 to generate MBM016 did not increase the amount of paraxanthine produced, but did slightly increase the rate at which paraxanthine was formed (FIG. 11A). When ndmD was replaced with ndmDP1, there was no significant difference between paraxanthine production in MBM006 and MBM018 (FIG. 11B). However, an increase in both paraxanthine yield and rate was observed when comparing MBM013 with MBM019 (FIG. 11C). MBM019 was the highest paraxanthine-generating strain constructed, with production of 181±5 µM paraxanthine over five hours. This strain includes the ndmDP1 reductase gene for improved N-demethylase activity and the frmAB genes for NADH recycle.

Example 9

Figures 16A, 16B, 16C:
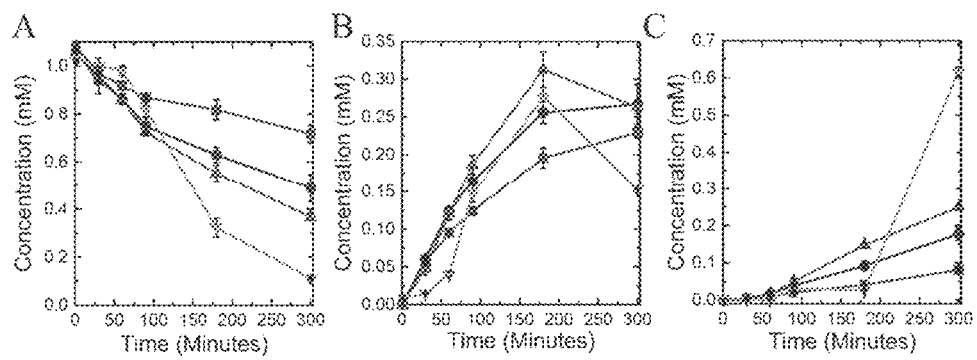
FIGS. 16C-16C show resting cell assays of MBM013 at varying cell concentrations convert caffeine (FIG. 16A) to paraxanthine (FIG. 16B) and 7-methylxanthine (FIG. 16C). The varying cell concentrations include $OD_{600}$ of 50 (▼), 20 (▲), 10 (●) and 5 (■).
Figures 17, 18A, 18B, 18C, 18D, 18E, 18F:
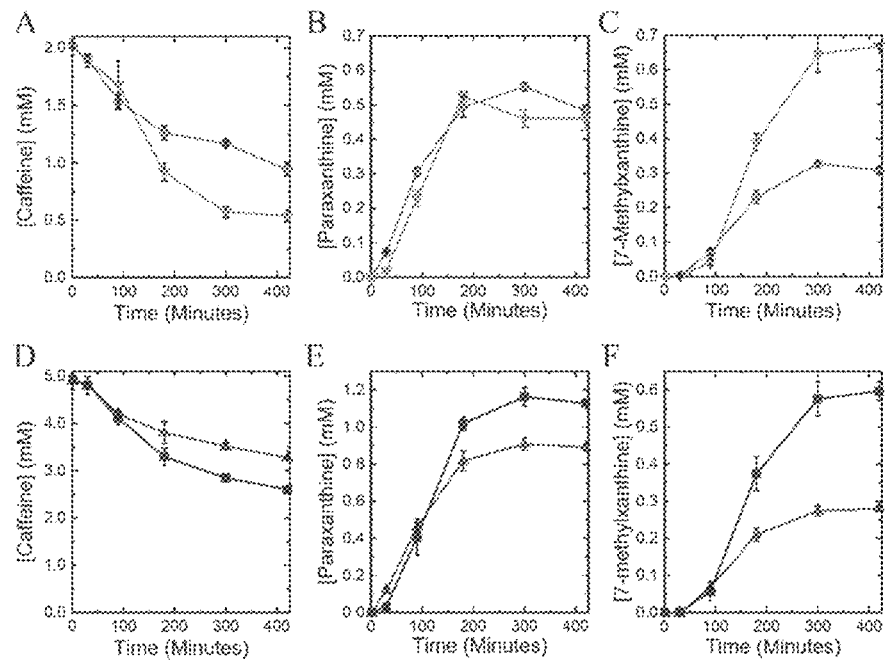
FIG. 17 is a table of the comparison of caffeine conversion to paraxanthine and 7-methylxanthine by strain MBM013 at varying optical densities.
FIGS. 18A-18F show the comparison of when strain MBM019 was reacted with caffeine (FIG. 18A and FIG. 18D) to compare the overall conversion of substrate to paraxanthine (FIG. 18B and FIG. 18E) and 7-methylxanthine (FIG. 18C and FIG. 18F) at varying cell concentrations and caffeine concentrations. Combinations include an $OD_{600}$ of 50 and 5 mM caffeine (▼), 50 and 2 mM (■), 20 and 5 mM (●), and 20 and 2 mM (▲).

Because the best paraxanthine-producing strains consumed less than 30% of the caffeine in the resting cell assays over five hours, it was hypothesized that increasing cell concentration in the reaction would increase caffeine conversion to paraxanthine. To test this hypothesis, resting cell assays were performed with strain MBM013 at OD$_{600}$ of 5, 10, 20, and 50 while maintaining initial concentration of caffeine at 1 mM. Caffeine consumption increased with increasing cell density (FIG. 16, FIG. 17). Surprisingly, paraxanthine yields were similar at an OD$_{600}$ of 10 and 20, but were greatly reduced at an OD$_{600}$ of 50. This decrease in paraxanthine yield as cell concentrations increased can be accounted for in the increased concentrations of 7-methylxanthine (FIG. 17). The data demonstrate that NdmA4 can carry out both N$_3$-demethylation of caffeine and N$_1$-demethylation of paraxanthine and suggest that at a certain point during the reaction, the equilibrium shifts in favor of 7-methylxanthine. This would explain the discrepancies between the reactions with an OD$_{600}$ of 20 and 50, as well as high concentration of 7-methylxanthine seen in the OD$_{600}$ of 50 reaction (FIG. 17).

Because MBM019 showed increased activity when compared with MBM013 (FIG. 11C), MBM019 was used for further process optimization prior to scaleup. Cell concentration (OD$_{600}$ of 20 and 50) and initial caffeine concentrations of 2 and 5 mM were evaluated for paraxanthine production by MBM019. For both initial substrate concentrations, the higher OD$_{600}$ of 50 showed a greater overall conversion of caffeine than the OD$_{600}$ of 20 (FIG. 18, FIG. 13). The maximum paraxanthine concentration observed was 1163±49 µM from an assay with an initial caffeine concentration of 5 mM and cell OD$_{600}$ of 50. Thus, these initial reaction conditions were selected for scaleup to produce and isolate paraxanthine.

Example 10

Figure 19:
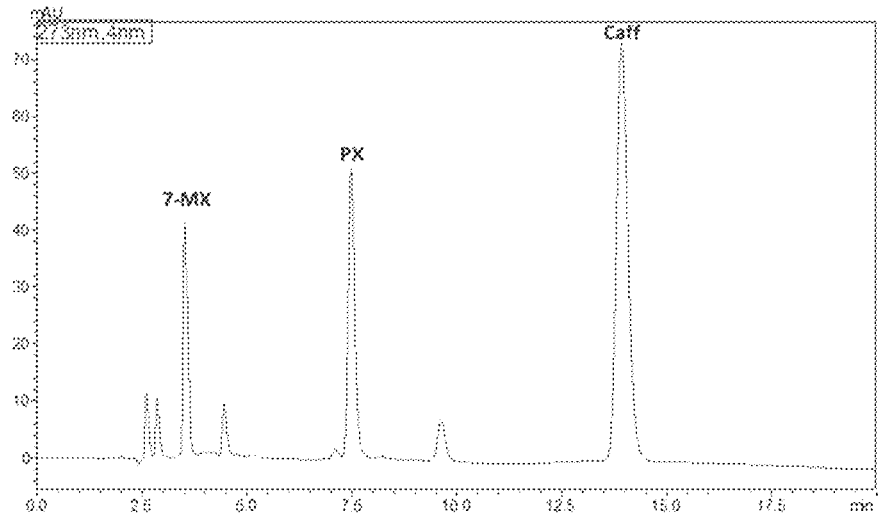
FIG. 19 is the HPLC chromatograph confirming the products found at the conclusion of the 15 mL resting cell assay prior to large-scale production and product separation via HPLC.

For the production and purification of paraxanthine, strain MBM019 was tested in a 15 mL reaction prior to the full scale-up at an OD$_{600}$ of 50 and a caffeine concentration of 5 mM. Upon reaction completion, the cells were separated from the supernatant by centrifugation, and the methylxanthines in the supernatant were quantified by HPLC. This preliminary analysis revealed that 1,686±121 µM of caffeine was consumed during the reaction, a 33% molar conversion from 5 mM to approximately 3.35 mM caffeine, resulting in 905±26 µM paraxanthine, 350±19 µM 7-methylxanthine, and a few other minor unidentified products (FIG. 19). Although the overall reaction conversion was slightly lower than in the 2 mL reaction described above (FIG. 18), the concentration of paraxanthine would be sufficient to purify easily given a large reaction volume. Therefore, the reaction was scaled up.

Strain MBM019 was grown in four 2.8 L Fernbach flasks, producing 22.27 g wet cells, which was sufficient to be used in a 620 mL reaction with an $OD_{600}$ of 50. The cell-caffeine mixture was allowed to react for five hours to ensure maximum conversion before harvesting. At the conclusion of the large-scale reaction, caffeine was degraded to a final concentration of 2.51 mM (corresponding to 300 mg caffeine consumed), producing 1.02 mM paraxanthine and 0.60 mM 7-methylxanthine. Overall, 49.8 mol % of the caffeine was consumed; however, only 21.2 mol % of the initial caffeine was converted to paraxanthine with another 12.4 mol % caffeine used to generate 7-methylxanthine, summing to a total of 33.6 mol % conversion of caffeine. It is likely that some of the caffeine was converted to other products indicated by the presence of unknown peaks seen in the HPLC chromatograph in FIG. 19; however, it is not clear by HPLC analysis alone if these peaks correspond to 1-methylxanthine and xanthine or to other products.

Figure 20:
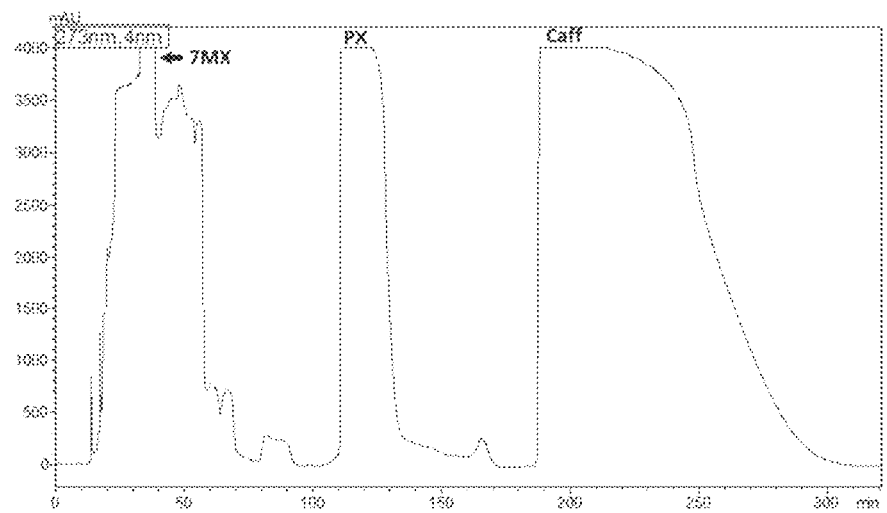
FIG. 20 is the HPLC chromatograph of 50 mL reaction supernatant loaded on the prep HPLC column for each round of separation.

Preparation of the reaction by filtration and addition of methanol for HPLC purification resulted in 648 mL supernatant. The purification conditions were optimized using approximately 41 mL, leaving 607 mL of 7.5% MeOH supernatant to be purified and collected. The mixture was loaded onto the column at a rate of 2.5 mL/min for 20 minutes, resulting in a total of 50 mL of supernatant loaded each round. A total of 5 hours and 20 minutes was required for all of the compounds to exit the column before the next round could be started. 7-Methylxanthine was partially purified but could not be fully separated and purified under these conditions due to overlap of other compound peaks (FIG. 20).

Figure 21:
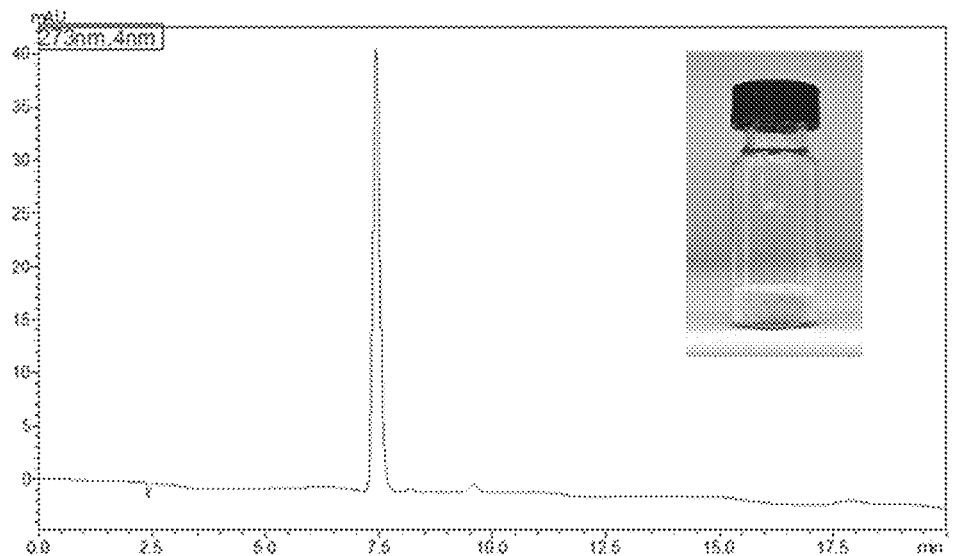
FIG. 21 is the HPLC chromatograph confirming the purity of the paraxanthine collected from the HPLC separation process. Inset: Purified powdered paraxanthine collected after HPLC and solvent evaporation.

Following HPLC purification (FIG. 20) and drying of paraxanthine, 104.1 mg paraxanthine was recovered (FIG. 21). Given that the final concentration of paraxanthine produced was 1.02 mM, the theoretical maximum amount of paraxanthine that could be recovered for this process was 114.5 mg. Compared to the actual collected mass, this process gave a recovery of 90.9%. The low conversion of caffeine to paraxanthine (21.2 mol %) remains the largest barrier to overcome. Development of other mutant N-demethylase enzymes with increased paraxanthine generation and decreased 7-methylxanthine production could greatly improve the yield of paraxanthine from caffeine. Nevertheless, combination of the reaction and purification processes described here could result in production of 168 mg paraxanthine per liter of resting cell reaction.

Example 11

Figure 22:
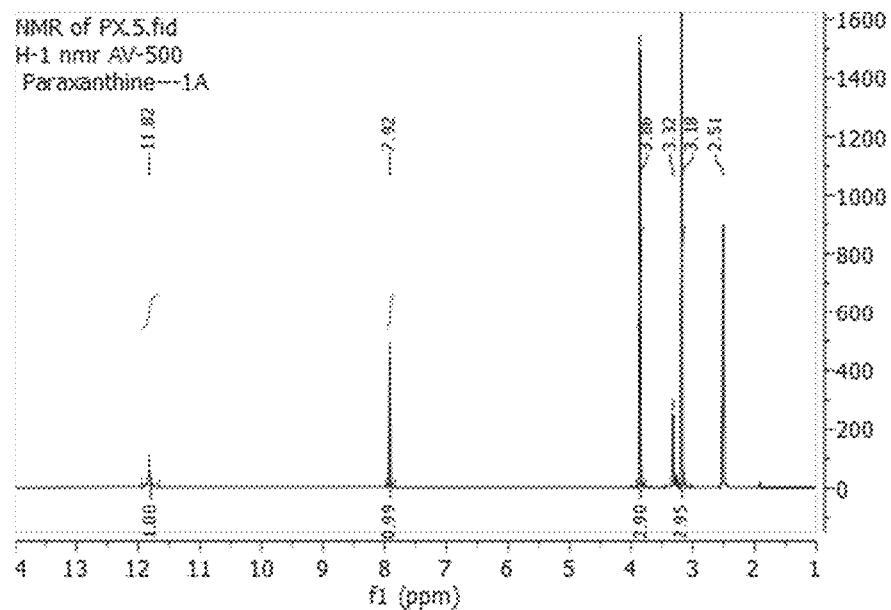
FIG. 22 is the H-NMR of HPLC-purified and dried paraxanthine in DMSO.

Paraxanthine purity was analyzed using authentic HPLC standards and the retention times were confirmed to be the same (FIG. 21). $^1$H NMR was also used to confirm the identity of the biologically produced paraxanthine (FIG. 22). The presence of peaks was confirmed at δ 11.82 (1H) corresponding to —NH, δ 7.92 (1H) corresponding to —C═CH, δ 3.86 (3H) and 3.18 (3H) corresponding to both —CH$_3$ groups. The peaks at δ 3.32 and δ 2.51 have been confirmed to correspond to water and DMSO, respectively. There is a very small amount of contamination observed just below δ 2 that is believed to be the presence of acetic acid.

Lastly, it should be understood that while the present disclosure has been provided in detail with respect to certain illustrative and specific aspects thereof, it should not be considered limited to such, as numerous modifications are possible without departing from the broad spirit and scope of the present disclosure as defined in the appended claims.

DISCUSSION

Kim et al. established that the specificity of the N-demethylase enzymes was determined by the distance between the N-methyl group and the non-heme iron catalytic center. In order to change which N-methyl group is removed by NdmA or NdmB, site-directed mutagenesis was performed to alter the substrate binding pocket on the enzyme to try and rotate the caffeine substrate. The mutations to NdmB altered the rates of reaction with theobromine negatively, but were unable to change the enzyme selectivity from the $N_3$-methyl group to the $N_1$-methyl group on caffeine or theophylline. This is consistent with previous observations that the NdmB binding pocket may not be large enough to accommodate molecules with both $N_1$- and $N_3$-methyl groups.

In contrast to the NdmB results, mutations to NdmA did change the N-methyl positional selectivity of the enzyme toward caffeine and theophylline. The N282Q F286L double mutant, NdmA3, greatly shifted selectivity toward the $N_3$-methyl group, and catalytic activity was further improved by swapping out a loop near the active site for the counterpart from NdmB. Resting cell assays with NdmA3 and NdmA4 cells accumulated significant amounts of paraxanthine from caffeine, which may enable biocatalytic production of paraxanthine in the future. Previous crystal structures of the NdmA3 enzyme with caffeine demonstrated that caffeine was bound in the reverse orientation as in NdmA, resulting in increased removal of the $N_3$-methyl group. This report provides additional support for those findings and demonstrates this activity in vivo. The reduction in activity of NdmA4 toward theophylline compared with caffeine is curious. It may be that the β-loop from NdmB that was exchanged for the existing NdmA loop to create NdmA4 might interact with the $N_7$-methyl group, stabilizing or guiding the substrate to the pocket.

Yoneyama et al. determined that more than one amino acid was responsible for the recognition of purine derivatives and substrate discrimination in the theobromine synthase from *Camellia ptilophylla* and caffeine synthase from *Camellia sinensis*, and that the substrate specificity for xanthine derivatives is established by the residues in the central part of the enzyme. Additionally, sequence alignment of the central 173 amino acids of each synthase revealed that there were only 9 amino acids that differed. This is supported by the fact that the single mutations did not change the substrate positioning, only the rate of reaction. The findings presented here align with this knowledge. While single mutations affected the reaction rates of both NdmA and NdmB, only the N282Q mutation on NdmA resulted in a large change in positional specificity. The theobromine and caffeine synthase enzymes essentially carry out the reverse reaction (N-methylation) compared with the N-demethylases in this study, but each must bind and properly align the methylxanthine for activity to occur.

Most metabolic engineering studies focus on modifying metabolism by altering gene expression, but recent studies have demonstrated that point mutations in enzymes can also be used to control flux of a compound through a metabolic pathway. The ability of mutations to either increase or decrease the overall reaction rate of catalytic reductases has been studied with some success in other enzymes. For example, error-prone PCR has been used in *Saccharomyces cerevisiae* to improve the cofactor binding of a xylose reductase, which resulted in an increase in production of nearly 40 times. Additionally, distal point mutations within dihydrofolate reductase have been used to reduce the reaction rate and act as a probe to explore the relationship between the chemistry that the enzyme catalyzes and the protein structure beyond just the active site. Here, the potential of simple point mutations in the electron transfer protein NdmD was explored to reduce the reaction rate of the N-demethylases NdmA and NdmB, creating several reductase mutants that lead to a wide range of N-demethylase activity in whole cell biocatalysts. This allows for fine-tuning of the overall process by controlling substrate conversion at the enzymatic level. Additional biochemical studies on purified mutant enzymes will be necessary to determine exactly how the mutations described here affect the electron transfer between the reductase and N-demethylase.

The data presented here are different from the mutant activity reported previously. In the previous report, the double mutant (NdmA3) exhibited slight activity toward caffeine, but activity of the loop-swapped double mutant (NdmA4) and reductase mutants (NdmDW and NdmDR) was almost negligible when using purified enzymes. By using whole-cell biocatalysts, it has been demonstrated that NdmA4 does, indeed, demonstrate activity toward caffeine and that the reductase mutants show varying levels of activity in vivo. One explanation for the increased activity is the amount of enzyme present. A strong T7 promoter was used to drive expression of the N-demethylase genes, but have not accounted for solubility differences between the different mutant enzymes. Thus, these results are not meant to represent activity of a specific enzyme, but the activity of the whole-cell biocatalysts containing the desired enzymes.

Although new biocatalysts for production of methylxanthines have been generated, the catalytic rates could be improved with additional engineering. In order to optimize a binding site, there are three things to consider: the hydrogen bonding and van DerWaals interactions, the shape of the site relative to the substrate or ligand, and finally the structure of the protein in the unbound state to minimize entropy losses. In addition to hydrogen bonds, polar interactions and ion pairing also regulate binding specificities. Kim et al. identified the residues that interact directly with caffeine in the NdmA and NdmB binding pockets are due to hydrophobic interactions, and that the NdmA3 protein reverses the orientation of caffeine in the binding pocket. A computational model of the mutant enzyme would be beneficial to further optimize the hydrogen bonding and charges of the substrate and protein residues in order to increase enzyme solubility and activity. Hydrogen bonding specifically has been identified as one way to increase affinity of ligands or substrate with a mutant receptor, and optimization of charges in both binding pocket and adjacent residues can have an impact on specificity. Mutations of residues near the binding or catalytic site are prone to affect substrate choice and offer new catalytic activities, enantioselectivity, and specificity. Other enzymatic properties may also be improved by mutations further out from the active site.

While generation and screening of large mutant libraries for increased catalytic activity have great potential, in this case there are currently challenges in the ability to effectively screen mutants for increased production of a specific methylxanthine. The only current process to detect and quantify caffeine metabolites is by HPLC. Although this method is the most accurate way to monitor and detect caffeine degradation, it is very time and labor intensive, and requires a large amount of materials. Development of new colorimetric or fluorescence-based methods to determine presence of specific caffeine metabolites will further increase the rate at which mutants can be generated for enhanced biocatalytic production of methylxanthines.

It has been determined that the effect of distinct mutations on activity of the caffeine $N_1$-demethylase NdmA expressed in whole cell biocatalysts and successfully swapped the specificity of NdmA from the $N_1$- to the $N_3$-methyl group of caffeine and theophylline. It has also been demonstrated the potential to specifically control the rate of reaction using mutants of the NdmD reductase. Using this understanding, novel bacterial systems have been developed to expand the ability to produce high-value methylxanthine compounds, such as 1-methylxanthine and paraxanthine. Further optimization of the enzymes and strains can only improve upon the activity and stability shown here.

Methylxanthines offer a variety of promising medical properties, mostly due to their ability to act as an adenosine receptor antagonist. Caffeine and its derivatives have already been tested for their potential use in the treatment of Alzheimer's disease and numerous studies have shown them to be a promising treatment for Parkinson's disease. They are also believed to reduce arterial stiffness, act as antioxidants and even inhibit HIV-1 replication. Methylxanthine derivatives have also been investigated for possible anti-inflammatory effects on inflammatory bowel disease. The ability of methylxanthines to cross the blood-brain barrier can be exploited in the formation of new drugs derived from methylxanthine scaffolds. These can be used for the treatment of central nervous system disorders and can even be developed as anti-cancer agents.

Specifically, paraxanthine has been found to be more effective than caffeine or its dimethylxanthine counterparts at attenuating liver fibrosis and is a promising therapeutic in the treatment of the inflammation seen in chronic obstructive pulmonary disease (COPD). There is even less research focused on the medical benefits of 7-methylxanthine; however, it has been shown to prevent the progression of myopia and slow axial eye growth in children.

The effect of paraxanthine on nitric oxide (NO) and cGMP levels as an AIR antagonist could open the door for a new class of therapeutic drugs designed to alleviate drug addiction and basal ganglia disorders. Methylxanthines possess some anticarcinogenic properties, however, this can be amplified when the structures are used to construct N-heterocyclic carbene (NHC) complexes. Production of paraxanthine can diversify the possible structures achievable for the design of new drugs, such as NHC complexes for the treatment of cancer.

With so many potential medical applications, the need for a reliable source of paraxanthine production has encouraged the investigation of synthetic routes of production. A direct methylation of xanthine by an alkylation/deprotonation method has been proven to successfully produce 3-methylxanthine, however, the product was not pure and de-protecting the methylxanthine required a catalyst, high pressures, high temperatures and long reaction times. Imidazole derivatives offer a new, somewhat milder route of synthesis, but still require the use of a strong solvent, such as THF. Solid-phase synthetic routes require high cost CHO (carbon, hydrogen, and oxygen) resins in organic solvents, which limits the practicality of large scale production. Even more mild routes of synthesis capable of producing 1-, 3-, and 7-substituted xanthines are only moderately successful and still required multiple, complicated steps. Whole-cell biosynthetic production offers the much-needed alternative to purely synthetic production of paraxanthine.

This is the first report of a biocatalytic production process for the high-value biochemical paraxanthine using *E. coli* strain MBM019. The process described here produced 114.5 mg paraxanthine from 300 mg caffeine under ambient conditions using a simple biocatalytic reaction. Further, 104.1 mg paraxanthine powder was isolated via prep-scale HPLC with a purification yield of 90.9%. This first demonstration of biocatalytic paraxanthine production will provide the foundation for additional increases in conversion and yield via enzyme, strain, and process improvements.

What is claimed is:

1. A method of preparing paraxanthine (1,7-dimethylxanthine) and/or 7-methylxanthine, comprising: contacting a bacterial strain expressing N-demethylase or a mutant thereof with caffeine, theobromine, or theophylline; wherein the bacterial strain also overexpresses frmAB.

2. The method of claim 1, wherein the bacterial strain is *E. coli*.

3. The method of claim 1, wherein the strain is contacted with caffeine.

4. The method of claim 1, wherein the strain is contacted with theobromine.

5. The method of claim 1, further comprising isolating paraxanthine (1,7-dimethylxanthine) and/or 7-methylxanthine.

* * * * *